US008670497B2

(12) United States Patent
Grant et al.

(10) Patent No.: US 8,670,497 B2
(45) Date of Patent: Mar. 11, 2014

(54) METHOD AND APPARATUS FOR IMPAIRMENT CORRELATION ESTIMATION IN A WIRELESS COMMUNICATION RECEIVER

(75) Inventors: Stephen J. Grant, Pleasanton, CA (US); Leonid Krasny, Cary, NC (US); Yi-Pin Eric Wang, Fremont, CA (US); Karl Molnar, Cary, NC (US); Jung-Fu Cheng, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/253,412

(22) Filed: Oct. 5, 2011

(65) Prior Publication Data

US 2012/0027115 A1 Feb. 2, 2012

Related U.S. Application Data

(63) Continuation of application No. 11/449,258, filed on Jun. 8, 2006, now Pat. No. 8,045,638, which is a continuation-in-part of application No. 10/795,101, filed on Mar. 5, 2004, now Pat. No. 7,339,980.

(60) Provisional application No. 60/689,693, filed on Jun. 10, 2005.

(51) Int. Cl.
*H04B 7/02* (2006.01)

(52) U.S. Cl.
USPC .......................................................... 375/267

(58) Field of Classification Search
USPC .......... 375/150, 260, 267, 285, 295, 299, 316, 375/347, 349
See application file for complete search history.

(56) References Cited

U.S. PATENT DOCUMENTS

| 6,473,467 B1 * | 10/2002 | Wallace et al. ............... 375/267 |
| 6,952,454 B1 * | 10/2005 | Jalali et al. ..................... 375/260 |

(Continued)

FOREIGN PATENT DOCUMENTS

| JP | 2002-217752 | 8/2002 |
| WO | 2005/034383 A2 | 4/2005 |

OTHER PUBLICATIONS

Lucent Technologies, "HS-DPCCH Power Requirements with HS-Pilot and Repetition," 3GPP TSG-RAN WG1#25, R1-02-0554, Apr. 9-12, 2002, pp. 1-7, Paris, France.

(Continued)

*Primary Examiner* — Khanh C Tran
(74) *Attorney, Agent, or Firm* — Coats and Bennett, P.L.L.C.

(57) ABSTRACT

A wireless communication receiver improves signal impairment correlation estimation in MIMO/MISO systems by considering different transmit power allocations and different transmit antenna power distributions in its impairment correlation calculations. The receiver may be implemented in according to a variety of architectures, including, but not limited to, Successive Interference Cancellation (SIC) Generalized RAKE (G-RAKE), Joint Detection (JD) G-RAKE, and Minimum Mean Squared Error (MMSE) G-RAKE. Regardless of the particular receiver architecture adopted, the improved impairment correlations may be used to calculate improved (RAKE) signal combining weights and/or improve channel quality estimates for reporting by receivers operating in Wideband CDMA (W-CDMA) systems transmitting HSDPA channels via MIMO or MISO transmitters. A transmitter may be configured to facilitate impairment correlation determinations by wireless communication receivers operating in MIMO/MISO environments, by signaling one or more values, e.g., data-to-pilot signal transmit power ratios and/or transmit antenna power distributions for the data and pilot signals.

1 Claim, 8 Drawing Sheets

(56) References Cited

U.S. PATENT DOCUMENTS

| | | | |
|---|---|---|---|
| 6,961,388 B2 * | 11/2005 | Ling et al. | 375/267 |
| 7,286,609 B2 * | 10/2007 | Maltsev et al. | 375/267 |
| 7,369,523 B2 * | 5/2008 | Papasakellariou et al. | 370/328 |
| 8,064,537 B2 * | 11/2011 | Xu et al. | 375/297 |
| 2003/0128769 A1 | 7/2003 | Kim et al. | |
| 2004/0052315 A1 * | 3/2004 | Thielecke et al. | 375/299 |

OTHER PUBLICATIONS

Ericsson, "Details of latency reduction alternatives", 3GPP TSG-RAN WG2 #67bis, Oct. 12-16, 2009, Miyazaki, Japan, R2-095805.

Ericsson et al., "Impacts of contention based uplink in RAN2", 3GPP TSG-RAN WG2 #68bis, Jan. 18-22, 2010, Valencia, Spain, R2-100125.

* cited by examiner

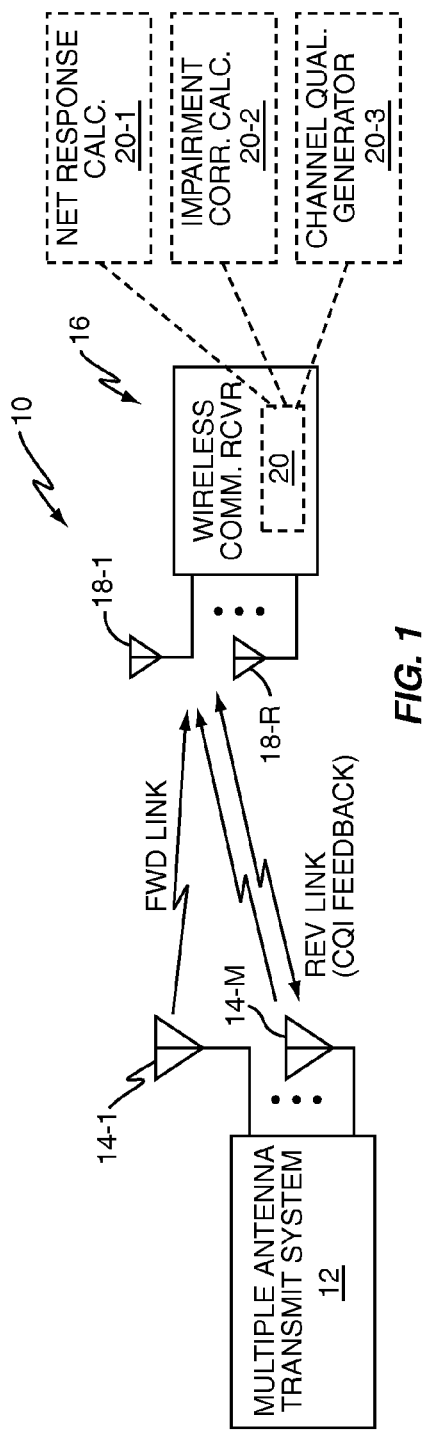
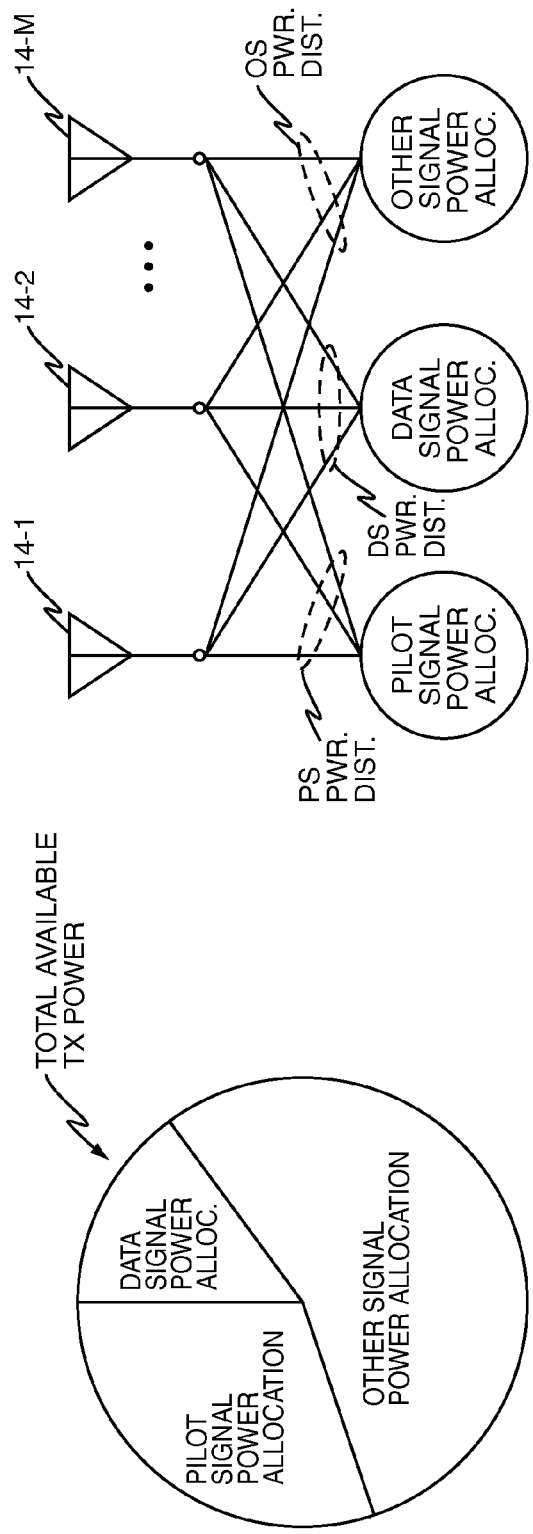
FIG. 1
FIG. 2
FIG. 3

METHOD AND APPARATUS FOR IMPAIRMENT CORRELATION ESTIMATION IN A WIRELESS COMMUNICATION RECEIVER

RELATED APPLICATIONS

This application is a continuation of, and claims priority under 35 U.S.C. §120 from, the United States patent application filed on 8 Jun. 2006, entitled "Method and Apparatus for Impairment Correlation Estimation in a Wireless Communication Receiver" and assigned application Ser. No. 11/449,258, which is a continuation-in-part of the United States patent application filed 5 Mar. 2004, entitled "Successive Interference Cancellation in a Generalized RAKE Receiver Architecture," and assigned application Ser. No. 10/795,101 and now issued as U.S. Pat. No. 7,339,980, and additionally claims priority under 35 U.S.C. §119(e) from the U.S. provisional patent application Ser. No. 60/689,693, filed Jun. 10, 2005. These priority applications are incorporated by reference herein.

TECHNICAL FIELD

The present invention relates to wireless communication networks, and particularly relates to estimating received signal impairment correlations in multiple-antenna transmission systems, such as in Multiple-Input-Multiple-Output (MIMO) systems and Multiple-Input-Single-Output (MISO) systems.

BACKGROUND

The determination of received signal impairment plays an important role in communication signal processing. For example, some types of interference-canceling receivers exploit the correlation of signal impairments between multipath components of the received signal to improve interference suppression. Generalized RAKE (G-RAKE) receivers exemplify such operations by generating a combined signal for demodulation based on combining multipath delay components of a received signal of interest using combining weights W that incorporate impairment correlation estimates.

In more detail, the combining weights W may be expressed as $W=R^{-1}h$, where $R^{-1}$ is the inverse of an impairment covariance matrix R, and h is the channel response vector. (The covariance matrix may be used to represent zero-mean impairment correlations.) G-RAKE combining thus depends on the calculation of the impairment correlation estimation, and similar dependencies exist in other types of interference-canceling receivers, such as chip equalizer architectures that calculate (equalization filter) weights W based on impairment correlations.

Further, received signal quality, $\rho$, may be expressed as a function of the weights ($\rho=h^*W=h^*R^{-1}h$). Signal quality estimation, such as channel quality estimation, plays an important role in many types of wireless communication systems. For example, some systems use rate-controlled channels that transmit data to individual users at the highest rates permitted by the available transmit power and the prevailing user-specific radio conditions. The data rate selected for a given user depends on channel quality feedback from that user. The High Speed Downlink Packet Access channels in the Wideband Code Division Multiple Access (W-CDMA) standards represent one type of rate-controlled channel dependent on channel quality feedback, while the shared Forward Packet Data Channels (F-PDCHs) in the cdma2000 standards represent another type of rate-controlled channel.

Regardless of the particular standards involved, under-reporting channel quality generally results in system inefficiencies, because individual users are served at rates lower than could be supported by the actual conditions. Over-reporting channel qualities also leads to inefficiencies and, in fact, may be worse than under-reporting because the ARQ protocols often used in such systems generate excessive data retransmissions when data rates are set too high for the actual conditions.

With HSDPA signals, and similar types of signals in other communication network types, a number of users share a packet data channel in time-multiplexed fashion. For example, the information streams for multiple users may be time-multiplexed by a base station scheduler onto a shared packet data channel, such that only one user is being served at any given time. User-specific radio conditions and the currently available transmit power and spreading code resources at the transmitting base station determine the per-user data rates achieved on the shared channel.

Service schedulers oftentimes based ongoing scheduling decisions as a function of the data rates each user can be served at—i.e., schedulers often favor users in better radio conditions, since such users can be served at higher rates, which increases the aggregate data throughput of the shared channel. Therefore, individual users feed back channel quality estimates for the shared channel signal, on an ongoing basis, in support of dynamic scheduling. Practically, this fact means that users estimate channel quality for the shared channel during times whether or not they are actually receiving data on the share channel.

Accurate channel quality reporting in the above context is challenging in Single-Input-Single-Output (SISO) systems, and even more so in Multiple-Input-Multiple-Output (MIMO) and Multiple-Input-Single-Output (MISO) systems. Indeed, in systems having multiple transmit antennas, such as MIMO and MISO systems, data signals may be transmitted from more than one antenna, and data signal spreading codes may be reused across the antennas, i.e., multi-coding may be employed. Further, other signals—e.g., voice, dedicated packet, broadcast, control, and overhead channel signals—may be transmitted from one or more of the antennas.

SUMMARY

A wireless communication receiver improves signal impairment correlation estimation in MIMO/MISO systems by considering different transmit power allocations and different transmit antenna power distributions in its impairment correlation calculations. The receiver may be implemented according to a variety of architectures, including, but not limited to, RAKE receivers employing successive interference cancellation methods, joint detection methods, or minimum means squared error methods. Regardless of the particular receiver architecture adopted, the improved impairment correlations may be used to calculate improved (RAKE) signal combining weights and/or improve channel quality estimates for reporting by receivers operating in Wideband CDMA (W-CDMA) systems transmitting HSDPA channels via MIMO or MISO transmitters.

However, those skilled in the art should appreciate that the present invention is not limited to the above features and advantages. Indeed, those skilled in the art will recognize additional features and advantages of the present invention upon reading the following detailed description of selected embodiments of the invention, and upon viewing the corresponding drawings.

BRIEF DESCRIPTION OF THE DRAWINGS

FIG. 1 is a partial block diagram of a wireless communication, including a multiple antenna transmitter transmitting to one or more wireless communication receivers.

FIG. 2 is a diagram of transmit power allocations at the transmitter of FIG. 1, for the different types of signals being transmitted by it.

FIG. 3 is a diagram of transmit antenna power distributions at the transmitter of FIG. 1, for the different types of signals being transmitted by it.

DETAILED DESCRIPTION

Figure 4:
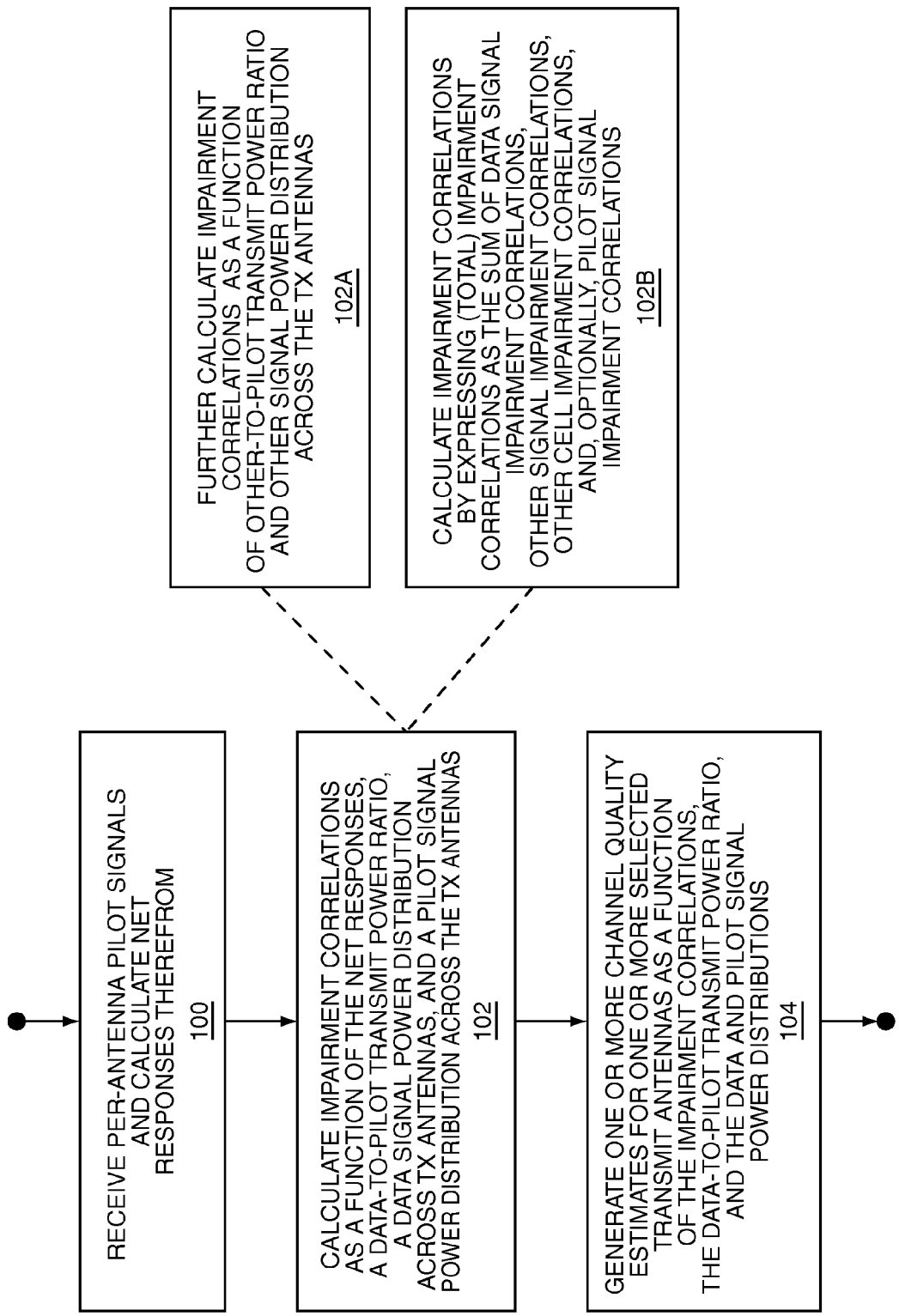
FIG. 4 is a logic flow diagram of channel quality estimation at the wireless communication receiver of FIG. 1, according to one embodiment of channel quality estimation taught herein.

FIG. 1 partially illustrates a wireless communication network 10, including a multiple antenna transmitter 12, configured to transmit forward link signals via multiple transmit antennas 14-1 through 14-M, referred to collectively as "transmit antennas 14." A wireless communication receiver 16, e.g., a cellular radiotelephone or other type of wireless communication device, receives one or more of the forward link signals being transmitted by the transmitter 12 on its receive antennas 18-1 through 18-R, referred to collectively as "receive antennas 18." With multiple transmit and receive antennas, FIG. 1 thus illustrates a Multiple-Input-Multiple-Output (MIMO) antenna system.

Currently, there is a high level of interest in MIMO antenna systems for enhancing the data rates for the high-speed-downlink-packet-access (HSDPA) provision of the WCDMA standard. These high-speed, shared channels are also known as High Speed Downlink Shared Channels (HS-DSCHs), and the Forward Packet Data Channel (F-PDCH) defined by the cdma2000 standards provides somewhat similar functionality. In any case, two techniques that have attracted significant attention are spatial-multiplexing, e.g., Code Reuse Bell Labs Layered Architecture Space-Time (CR-BLAST), which is a variant of the Vertical (V-BLAST) system, and Per Antenna Rate Control (PARC).

These and other MIMO approaches generally involve transmitting per-antenna pilot signals to facilitate per-antenna channel estimation at the receiver 16, transmitting data signal substreams from all or selected ones of the transmit antennas 14, and transmitting other (additional) signals from one or more of the transmit antennas 14. Examples of "other" signals include overhead channels, broadcast and control channels, and various dedicated channels (e.g., voice and dedicated packet data). As used herein, the term "data signal" and "data signals" generally connote high-speed, shared data channels, such as the HS-DSCH, unless otherwise indicated.

FIGS. 2 and 3 graphically illustrate transmit power allocations and transmit antenna power distributions for the data signal(s), pilot signals, and other signals. In particular, FIG. 2 illustrates that the transmitter 12 has a finite amount of transmit power available for allocation to the various signal types to be transmitted, and thus makes specific allocations of the total transmit power to the data, pilot, and other signals. Further, the transmitter 12 must split the power allocated to a given type of signal among the available transmit antennas 14. That is, a certain amount of allocated pilot signal power is distributed to each of the antennas 14, and certain amounts of data signal and other signal powers also are distributed among the antennas 14.

For example, a certain amount of pilot power generally is transmitted from each of the antennas 14, to facilitate per-antenna channel estimation at the receiver 16. However, the other signals all may be transmitted from a single one of the transmit antennas 14, or from a fixed subset of them, and thus the other signal power allocation typically is not split out to all of the antennas 14. Similarly, while the data signal(s) may be transmitted from all of the antennas 14, performance may be improved by transmitting them from a subset of the antennas 14, particularly where that subset is dynamically selected responsive to feedback from the receiver 16.

Providing accurate impairment correlation estimation represents a significant challenge for the receiver 16, in regard to the above context. Because accurate impairment correlation estimation stands as a precursor to other received signal processing operations, such as combining or equalization filter weight generation, or channel quality estimation, the receiver 16 must satisfactorily address such challenges. To that end, the receiver 16 includes one or more processing circuits 20 that are configured to generate impairment correlation estimates for one or more data signals transmitted in conjunction with pilot signals from the transmit antennas 14 of the transmitter 12.

More particularly, in at least one embodiment, the one or more processing circuits are configured to calculate the impairment correlations based on determining a data-to-pilot signal transmit power ratio and transmit antenna power distributions for the data and pilot signals, and calculating the impairment correlations as a function of the data-to-pilot signal transmit power ratio and the transmit antenna power distributions for the data and pilot signals. Further, in one or more embodiments, such calculations consider the current MIMO mode, which may affect, for example, the transmit antenna power distribution for the data signals. Thus, among other parameters or values, the transmit antenna power distribution for the data signals may be determined based on the current MIMO configuration.

In one embodiment, at least one of the data-to-pilot signal transmit power ratio and transmit antenna power distributions for the data and pilot signals comprise signaled values received by the receiver 16. More generally, this disclosure teaches a method of supporting impairment correlation estimations by wireless communication receivers operating in a MIMO or MISO communication system that includes a transmitter having multiple transmit antennas and transmitting one or more data and pilot signals. In one embodiment, such a method comprises signaling at least one of a data-to-pilot signal transmit power ratio and transmit antenna power distributions for the data and pilot signals being transmitted by the wireless communication transmitter. Further, such signaling may be dynamically updated as a function of a current Multiple-Input-Multiple-Output (MIMO) mode. In this way, changing power ratios and/or transmit antenna power distributions can be signaled to the receivers for use in calculating impairment correlations.

In another embodiment, at least one of the data-to-pilot signal transmit power ratio and transmit power antenna distributions for the data and pilot signals comprise nominal values stored in the receiver 16. Further, in another embodiment, other signals, including voice signals, are transmitted from the transmit antennas 14 according to an other-to-pilot signal transmit power ratio and a transmit antenna power distribution for the other signals. In this case, the one or more processing circuits 20 are further configured to determine the other-to-pilot signal transmit power ratio and the transmit antenna power distribution for the other signals, and calculate the impairment correlations additionally as a function of the other-to-pilot signal transmit power ratio and the transmit antenna power distribution for the other signals. More particularly, the one or more processing circuits may be configured to express the impairment correlations as a sum of a first impairment correlation term representing impairments arising from the transmission of the one or more data signals and scaled according to the data-to-pilot signal transmit power ratio, a second impairment correlation term representing impairments arising from the transmission of the other signals and scaled according to the other-to-pilot signal transmit power ratio, and a third impairment correlation term representing impairments arising from noise plus other-cell interference.

With this method, determination of the other-to-pilot signal transmit power ratio may be based on determining a chip sample covariance matrix prior to despreading the one or more data signals as received and expressing the chip sample covariance matrix as a function of a known data-to-pilot signal transmit power ratio, known transmit antenna power distributions for the pilot and other signals, a known noise estimate representing noise plus other-cell interference, an unknown or known currently selected subset of transmit antennas being used for transmission of the one or more data signals, and an unknown other-to-pilot signal transmit power ratio. The method continues with solving the expression for the unknown other-to-pilot signal transmit power ratio and, if unknown, the currently selected subset of transmit antennas being used for transmission of the one or more data signals, according to a maximum likelihood formulation.

In a similar embodiment, the currently selected subset of transmit antennas is known, and the expression thus comprises a function of a known data-to-pilot signal transmit power ratio, known transmit antenna power distributions for the pilot and other signals, an unknown noise estimate representing noise plus other-cell interference, a known currently selected subset of transmit antennas being used for transmission of the one or more data signals, and an unknown other-to-pilot signal transmit power ratio. In this embodiment, the method solves the expression for the unknown other-to-pilot signal transmit power ratio and the unknown noise estimate according to a maximum likelihood formulation. In general, it should be understood that the expression can have varying numbers of unknowns and the maximum likelihood formulation can be adapted accordingly. Of course, the solution search space increases with more unknowns.

In another embodiment, the one or more processing circuits 20 may be configured to model other-cell interference as white noise and solve for the noise plus other-cell interference by expressing the chip sample covariance matrix as a function of the noise plus other-cell interference and per-antenna traffic-to-pilot signal transmit power ratios, denoted as $\alpha_{T/P}(m)$, and defined as the ratio of the aggregate data, other, and pilot power on the m th transmit antenna 14 to the pilot power on the m th transmit antenna 14. With this approach, the one or more processing circuits 20 solve the corresponding system of equations for the noise plus other-cell interference according to a least squares formulation.

In another method embodiment, the impairment correlations are used to generate channel quality estimates for reporting by the receiver 16. For this method, the one or more processing circuits 20 are configured to calculate the impairment correlations additionally as a function of the other-to-pilot signal transmit power ratio and the transmit antenna power distribution for the other signals by calculating an other signal impairment correlation term scaled by the other-to-pilot signal transmit power ratio. In this case, the one or more processing circuits 20 express impairment correlations arising from the other signals as a function of a chip sample matrix obtained from received signal samples from which the influence of a currently selected set of transmit antennas being used for data signal transmission is removed. The method then determines the impairment correlations for one or more desired transmit antenna selections to be used for data signal transmission to the receiver 16 by considering the influence of those selections on the chip impairment covariance matrix. In this manner, the receiver 16 may be configured to provide improved channel quality estimates for the desired transmit antenna selections. In general, the receiver 16 can be configured to generate one or more channel quality estimates for one or more selected transmit antennas as a function of the impairment correlations, the data-to-pilot signal transmit power ratio, and the transmit antenna power distributions for the data and pilot signals.

Further, the receiver 16 may be configured as a type of RAKE receiver, wherein the one or more processing circuits 20 are configured to generate signal combining weights from the impairment correlations. One RAKE embodiment of the receiver 16 is configured for minimum mean square error (MMSE) detection. The one or more data signals each carry code symbols and the receiver 16 is configured to detect code symbols transmitted during the same symbol time on an individual basis, while treating all other code symbols as (colored) noise. In another RAKE embodiment, the receiver 16 is configured for joint detection, wherein it detects code symbols of the same code transmitted during the same symbol time on a joint detection basis, while treating all other code symbols as noise.

All such embodiments may be used advantageously for Wideband CDMA (W-CDMA) operation. In particular, the methods and apparatus taught herein for impairment correlation determination (and subsequent combining weight generation and/or channel quality estimation) may be advantages where the transmitter 12 is transmitting one or more High Speed Downlink Packet Access (HSDPA) channel signals from the multiple antennas 14.

With the above point in mind, more detailed discussion begins with an embodiment wherein the processing circuit(s) 20 comprise a net response calculator 20-1 that is configured to calculate net response vectors from per-antenna channel estimates, an impairment correlation calculator 20-2 that is configured to calculate impairment correlations, and, optionally, a channel quality estimate generator 20-3 that is configured to generate channel quality estimates as a function of the net response vectors and the impairment correlations. Those skilled in the art will appreciate that the processing circuit(s) 20 can be implemented in hardware, software, or any combination thereof. In at least one embodiment, the one or more processing circuits 20 are included in a baseband digital signal processor, or the like, included in the receiver 16.

FIG. 4 illustrates one embodiment of processing logic that may be implemented in the one or more processing circuits 20, wherein the processing circuit(s) 20 calculate net response vectors for a given set of receiver "finger" locations (Step 100)—i.e., the receiver 16 includes one or more correlator banks that are aligned with given multipath components of the signals transmitted by the transmitter 12 and additional correlation "fingers" may be aligned off-path as well, such as is done in Generalized RAKE (G-RAKE) applications. For example, $\tilde{h}_m$ is the net response vector corresponding to the m th transmit antenna, where the tilde notation for $\tilde{h}_m$ emphasizes the fact that the channel tap gains (on which the net response depends) are scaled by the pilot energy per symbol (at least in embodiments where the net response is formed parametrically using channel estimates obtained from the despread pilot symbols, which implicitly contain this scaling).

The q th element of the net response vector $\tilde{h}_m$ is given by $$\tilde{h}_m(q) = \sum_{p=1}^{P} \tilde{g}_{lmp} x(\tau_q - \tau_{lmp}) \qquad \text{Eq. (1)}$$

where q indexes a particular finger on the lth receive antenna 18. The location of this finger is specified by the delay $\tau_q$. P is the number of channel taps, and $\tau_{lmp}$ and $\tilde{g}_{lmp}$ are the delay and (pilot) scaled channel gain, respectively, of the p th tap of the channel between the m th transmit antenna and lth receive antenna. $x(\tau)$ is the autocorrelation of the chip-pulse shape. As just mentioned, the channel tap gains include the pilot energy scaling and are expressed as $$\tilde{g}_{lmp} = \sqrt{\alpha_{ps}(m) N_p E_p} g_{lmp} \qquad \text{Eq. (2)}$$

where $E_p$ is the total energy per-chip allocated to all pilots on all transmit antennas, $N_p$ is the spreading factor used for the pilot channels, e.g., $N_p = 256$ in the WCDMA standard, $\alpha_{ps}(m)$ is the pilot signal transmit power distribution for the mth antenna, and $g_{lmp}$ is the channel gain (unscaled) corresponding to $\tilde{g}_{lmp}$. The quantity inside the square-root is precisely the pilot energy per symbol on the m th transmit antenna.

Processing continues with the calculation of impairment correlations as a function of the net responses, and as a further function of the data-to-pilot signal transmit power ratio, the data signal power distribution across transmit antennas, and the pilot signal power distribution across the transmit antennas 14 (Step 102). Note that the impairment correlation calculation may further consider the other-to-pilot signal transmit power ratio and the other signal power distribution across the transmit antennas 14 (Step 102A). Thus, the (total) impairment correlations may be expressed as the sum of data signal impairment correlations, other signal impairment correlations, other cell impairment correlations, and, optionally, pilot signal impairment correlations (Step 102B).

With the impairment correlations thus calculated, the processing circuit(s) 20 generate one or more channel quality estimates for one or more selected transmit antennas 14, as a function of the impairment correlations, the data-to-pilot signal transmit power ratio, and the data and pilot signal transmit antenna power distributions (see FIGS. 2 and 3) (Step 104). As an example, the receiver 16 may calculate a channel quality estimate as a per-chip Signal-to-Interference-Ratio (SINR) on a per-code basis for an arbitrary transmit antenna selection, which can expressed as $$\rho = \left(\frac{\beta_{ds/ps}}{K}\right)\left(\frac{\alpha_{ds}(m)}{N_p \alpha_{ps}(m)}\right) \tilde{h}_m^\dagger \tilde{R}^{-1}(m) \tilde{h}_m \qquad \text{Eq. (3)}$$

where $\beta_{ds/ps}$ is the data signal to pilot signal transmit power ratio (total transmit power allocation ratios), K is the number of multi-codes allocated to the data signal (reused across active antennas), and $\alpha_{ds}(m)$ is the data signal transmit power distribution for the mth antenna. Further, $\tilde{h}_m$ is the net response vector corresponding to the m th transmit antenna ($\tilde{h}_m^\dagger$ is the Hermitian transpose of the net response vector), and $\tilde{R}$ is an impairment covariance matrix based on the impairment correlation determinations performed in Step 102.

As noted in Step 102, the total impairment correlations include several terms representing different sources of impairment. Thus, in one embodiment, the impairment correlations $\tilde{R}$ are expressed as $$\tilde{R} = \tilde{R}_{ds} \tilde{R}_{os} + \tilde{R}_{oc} \qquad \text{Eq. (4)}$$

where $\tilde{R}_{ds}$ is a data signal impairment correlation term that captures the interference due to the data channel signal(s), $\tilde{R}_{os}$ is an other signal impairment correlation term that captures the interference due to the other channel signals (e.g., voice, broadcast, overhead, etc.), and $\tilde{R}_{oc}$ is an other-cell interference plus noise impairment correlation term that captures the combination of other-cell interference and noise. If the other-cell interference can be approximated as white, then $\tilde{R}_{oc}$ is a diagonal matrix given by $\tilde{R}_{oc} = N_o \tilde{R}_{pulse}$ where $N_o$ is the power spectral density of the noise plus other-cell interference and $R_{pulse}$ is the pulse shape autocorrelation. (Note that the tilde notation connotes the implicit scaling discussed for the net response vector shown in Eq. (1).)

The impairment covariance matrix is split into several terms to reflect the fact that the data and voice channels traverse different fading channels. Also, note that the expression in Equation Eq. (4) implicitly assumes that pilot subtraction is performed in the receiver 16, thus there is no interference component due to the pilots. If the receiver 16 does not perform pilot subtraction, it will include a pilot signal impairment term, $\tilde{R}_{ps}$, in the impairment correlations, $\tilde{R}$.

Figure 5:
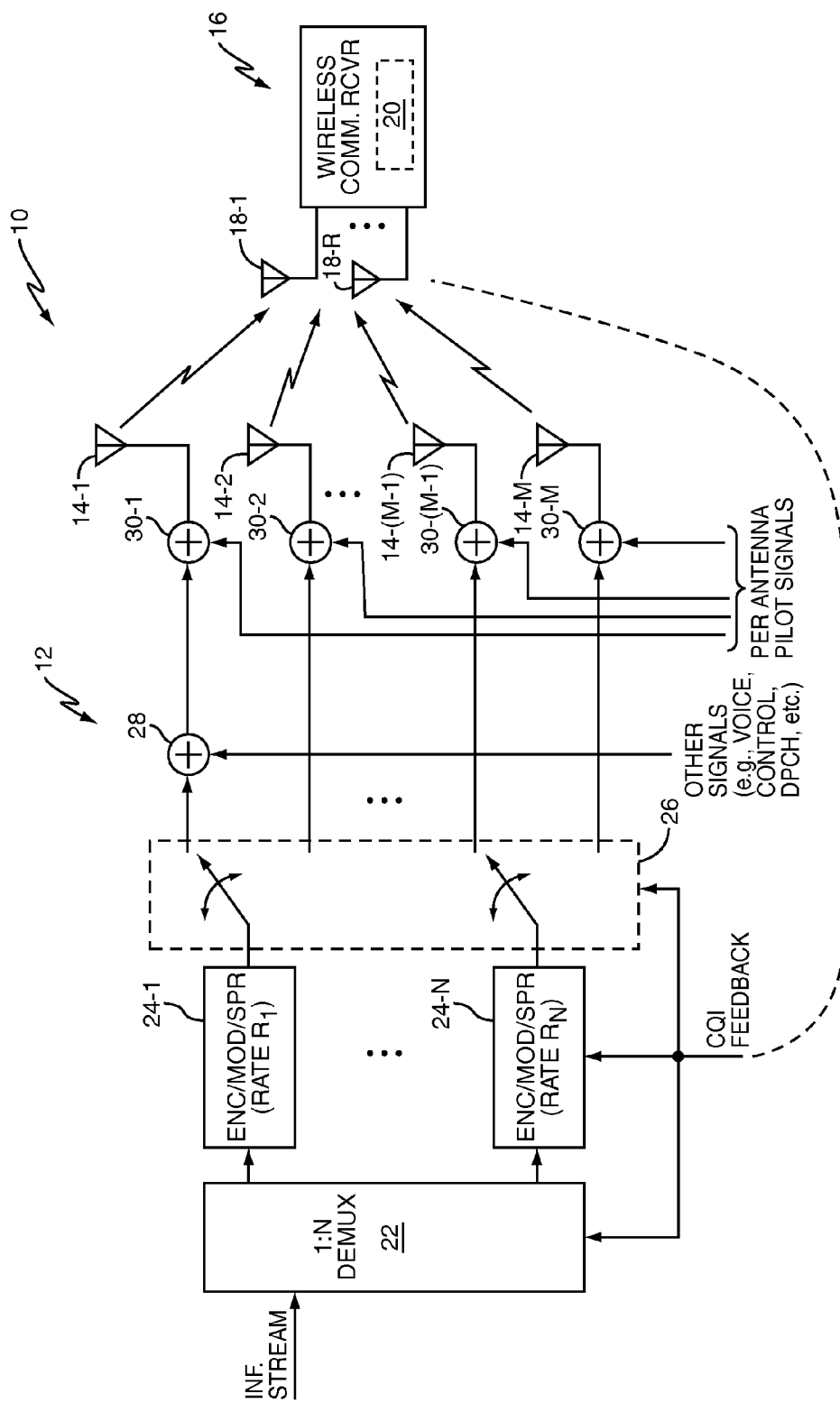
FIG. 5 is a block diagram of a Selective Per Antenna Rate Control (S-PARC) embodiment of the transmitter of FIG. 1, and wherein the wireless communication receiver is adapted to provide antenna selection feedback for S-PARC operations at the transmitter.

The above approach may be implemented specifically in accordance with a variety of transmitter and receiver architectures. For example, FIG. 5 illustrates a S-PARC transmit structure for the transmitter 12, showing the transmission of N data signal substreams from M transmit antennas 14 (N≤M). The illustrated S-PARC embodiment of the transmitter 12 comprises a 1:N demultiplexer 22, a plurality of encoders/modulators/spreaders 24, an antenna selector 26, a first summer 28, and additional summers 30-1 through 30-M corresponding to transmit antennas 14-1 through 14-M.

In operation, the demultiplexer 22 splits an information stream, e.g., a HS-DSCH bit stream, into N substreams, which feed into respective ones of the encoders/modulators/spreaders 24. The antenna selector 26 selects a subset of the antennas 14 for transmission of the resultant substreams output from the encoders/modulators/spreaders 24. The summer 28 combines a first one of those substreams with the other signals (voice, overhead, control, etc.) for transmission from a first one of the antennas 14, and the summers 30-1 through 30-M impress each of M pilot signals onto a respective one of the M transmit antennas 14.

For S-PARC, the demultiplexer 22, the encoders/modulators/spreaders 24, and the antenna selector 26 all operate responsive to channel quality feedback (e.g., Channel Quality Indicator (CQI) feedback) from the receiver 16. Thus, the transmitter 12 generally attempts to maximize throughput (or some other service metric) by selecting the number of substreams, the encoding rate and modulation format, and the particular transmit antenna subset, as a function of the receiver's channel quality feedback.

In S-PARC (as well as in other MIMO systems), the receiver's channel quality estimation operations are complicated by the fact that the data signals, pilot signals, and other signals all traverse different fading channels. For example, FIG. 5 shows the data signals transmitted from a selected subset of the antennas 14, the other signals transmitted only from a first one of the antennas 14, and the pilot signals transmitted from all of the antennas 14. The latter is necessary to enable estimation of all channels at the receiver 16.

CQI estimation is further complicated by the fact that the multiple spreading codes used for HSDPA are reused on different transmit antennas to avoid a code-limitation problem. As a result, the SINR measured by the receiver 16 on each of the pilot channels (for which code-reuse is not employed) is not related in a simple way to the SINRs that would be experienced by the data channel if the receiver was receiving scheduled data signal transmissions. Further, some receiver architectures apply interference cancellation to the data signals, which is not reflected automatically in pilot-based channel quality estimation. An even more significant issue is that the receiver 16 generally must report CQIs for one or more transmit antenna selections that are typically different from the currently selected transmit antenna subset. This circumstance arises because all receivers being served on the shared data signal could be required to report CQIs, even if they are not scheduled, and the current antenna selection is valid only for the scheduled receiver.

A first detailed approach to improved channel quality estimation, as taught herein for MIMO systems (and in Multiple-Input-Single-Output (MISO) systems), may be thought of as a full parametric method in that parametric forms for all of the own-cell interference (data, voice, pilots) as well as other-cell interference are used to form the impairment covariance matrix representing the impairment correlations to be considered by the receiver 16 in its channel quality estimation.

Since the impairment covariance matrix is formed "from scratch," it is not necessary to remove the influence of the transmitter's currently selected subset of transmit antennas 14. Instead, the matrix may be formed directly for all possible transmit antenna subsets for which the receiver 16 wishes to report CQIs. An advantage of this approach is that the bias correction method required for a partial-parametric method described later herein is not necessary. The trade-off, however, is that the color of the other-cell interference is not captured. Because propagation channel estimates are not available for other surrounding radio cells of the network 10, it is practical to model the other-cell interference as white when constructing the impairment covariance matrices that may be used to represent the impairment correlations. (Note that the term "impairment correlations" may be considered as practically interchangeable with the term "impairment covariance matrix," but it should be understood that the methods taught herein are not limited to the use of covariance matrices.)

In constructing the impairment covariance matrices, it generally is necessary to scale the different components (data, pilots, voice, and other-cell interference) appropriately. Separate scaling is necessary for MIMO and MISO systems since the data, pilots, and other signals all traverse different fading channels as mentioned before. This process is described in the context of a Successive Interference Cancellation (SIC) Generalized RAKE (G-RAKE) receiver architecture, as shown in FIG. 6, for the S-PARC transmitter configuration shown in FIG. 5.

Figure 6:
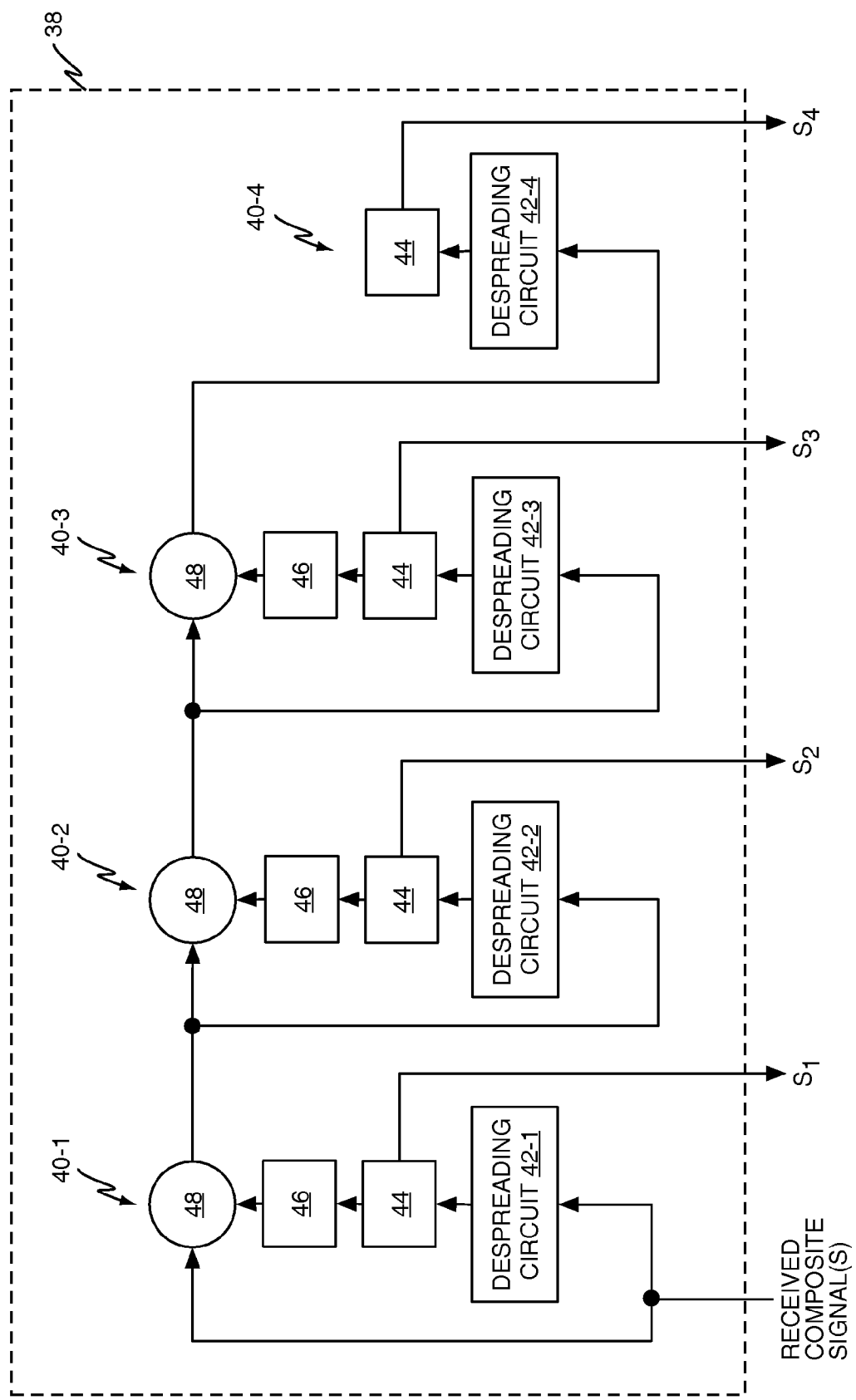
FIG. 6 is a block diagram of a Successive Interference Cancellation (SIC) Generalized RAKE (G-RAKE) embodiment of the wireless communication receiver of FIG. 1.

Specifically, FIG. 6 illustrates a SIC G-RAKE receiver circuit 38 that may be implemented in the receiver 16, and which provides successive interference cancellation for a multi-coded received data signal, included in the composite signal(s) received via the one or more antennas 18 of the receiver 16. The illustrated embodiment of the receiver circuit 38 comprises a plurality of interference cancellation stages 40-1 through 40-4 (other numbers of stages may be implemented as needed or desired), with all but the last such stage comprising a despreading circuit 42, a signal detection circuit 44, a signal regeneration circuit 46, and a summing circuit 48—the last stage 40-4 omits elements 46 and 48.

In one or more embodiments, the nth stage 40 of the receiver circuit 38 receives a stage input signal that is derived from the received composite signal(s). A cancellation signal from the prior stage 40-(n−1) removes interference caused by the signal detected by that prior stage and operations are carried out on despread values of that reduced-interference stage input signal.

In the context of channel quality estimation as taught herein, different channel quality estimates are generated at the different stages 40, to reflect the effects of successive interference cancellation. The RAKE combining weights generated in each stage also reflect successive interference cancellation effects. For example, the signal detection circuit 44 included in stage 40-n computes impairment correlations between the despread values of the stage input signal provided to stage 40-n. These impairment correlations are used along with net channel estimates, i.e., net response vectors, to form combining weights that in turn are used to form a combined signal by RAKE combining the different streams of despread values of the stage input signal. The different streams are generated by differently-aligned fingers of a RAKE despreader (i.e., by a number of correlators set to differing time alignments relative to the received composite signal).

The combined despread values, i.e., the RAKE combined signal, is demodulated to obtain soft values corresponding to estimates of the bits detected in the signal of interest. The signal of interest may comprise coded bits, in which case, the soft values may be decoded to obtain decoded bits. Stage 40-n generates bits from the soft values, either by making hard decisions directly on the soft demodulation values to obtain hard-detected bits, or by re-encoding decoded bits obtained from the soft values. Each stage may include a decoder circuit to obtain the decoded bits from the soft values obtained from demodulation of the RAKE combined signal, or a centralized decoder may be used. Although re-encoding the decoded bits to obtain coded bits needed for signal regeneration and cancellation operations entails additional processing, the re-encoded bits benefit from any error corrections made during decoding the soft values. As such, using re-encoded bits to generate the cancellation signal for the next stage can result in a more robust cancellation signal than one derived from coded bits obtained by applying hard-decision logic directly to the soft values.

Figure 7:
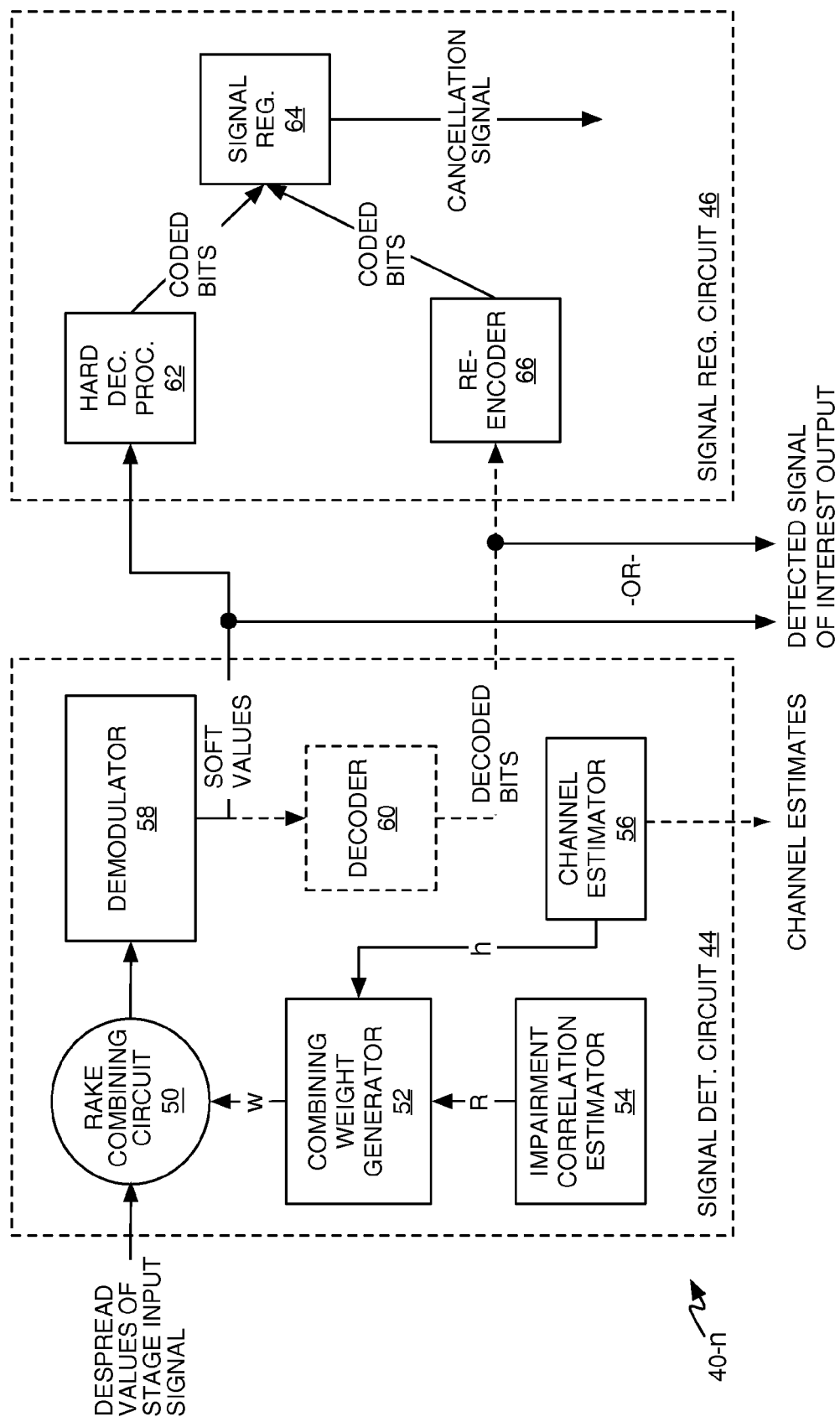
FIG. 7 is a block diagram of one embodiment of a SIC G-RAKE stage, for the SIC G-RAKE of FIG. 6.

FIG. 7 aids better understanding of the apparatus and methods described above by illustrating exemplary details for a given one of the stages 40. (Note that the illustration generally holds for all stages 40 but it should be understood that the last stage in the series could be configured without the signal regeneration circuit 46, etc.) As shown, the exemplary signal detection circuit 44 comprises a combining circuit 50, a combining weight generator 52, an impairment correlation estimator 54, a channel estimator 56, a demodulator 58, and, optionally, a decoder 60. The impairment correlation estimator 54 and channel estimator 56 may comprise a portion of the aforementioned processing circuit(s), which may be distributed across the stages 40, or duplicated in whole or in part in each stage 40, to carry out channel quality estimation according to the methods taught herein.

In reviewing further stage details, one sees that the signal regeneration circuit 46 may comprise a hard decision processor 62 and a signal regenerator 64, to provide the cancellation signal for the next stage 40 of the SIC G-RAKE circuit 38. As an alternative to the hard decision processor 62, if the detection portion of the circuit includes the decoder 60, the signal regeneration circuit 46 may include a re-encoder 66. Of course, it should be understood that the illustrated functional arrangement can be varied as needed. For example, the decoder 60 can be "located" in the regeneration circuit 46 and can output decoded bits corresponding to the detected signal for input to re-encoder 66 (and to higher-level processing circuits as needed or desired).

Regardless, the combining circuit 50 receives the different streams of despread values that comprise the stage input signal (or are derived from it), and forms a RAKE combined signal by combining the despread values according to combining weight vectors generated by combining weight generator 52. Those combining weights are calculated at least in part from impairment correlations between the despread values of the stage input signal and from the net channel response(s) associated with the signal of interest, i.e., the end-to-end channel including transmitter/receiver filter pulse shape and propagation effects.

While the channel estimator 56, which may be implemented per-stage as shown here, or implemented elsewhere in the receiver 16, provides the needed channel estimates, the impairment correlation estimator 54 generates the needed impairment correlation estimates. More specifically, the impairment correlation estimator 54 may calculate impairment correlations for the corresponding stage 40-n, according to the broad method outlined in FIG. 4. In other words, the impairment correlations and, hence, the combining weights and channel quality estimates, computed in each stage are stage-specific, and reflect the successively reduced levels of interference in the series of stages 40.

Of course, the functionality of the impairment correlation estimator 54 may be implemented to support impairment correlation estimation during times when the receiver 16 is unscheduled. During such times, the receiver 16 generally does not perform demodulation/decoding but does report channel quality. That is, during unscheduled times, the receiver 16 generally is not performing SIC-based demodulation/decoding operations, but still carries out impairment correlation estimation for CQI reporting purposes.

Returning to the SIC G-RAKE details of FIGS. 6 and 7, formulation of Signal-to-Interference Ratios (SINRs) underlying channel quality estimation begins with defining the data-to-pilot signal transmit power ratio $\beta_{ds/ps}$ as the ratio of the total amount of transmit power allocated to the data channel signal at the transmitter 12 to the total amount of transmit power allocated to all pilot signals at the transmitter 12. Similarly, the other-to-pilot signal transmit power ratio $\beta_{ds/ps}$ is the ratio of the total amount of transmit power allocated to all other signals (voice, control, overhead, etc.) at the transmitter 12 to the total amount of transmit power allocated to all pilots.

Next, one may define several transmit power distributions to be considered in channel quality estimation. First, one may denote the length-M vectors $a_{ds}$, $a_{os}$, and $a_{ps}$ as the distribution of the data, other, and pilot signal powers across the transmit antennas 14, with the m th elements denoted $a_{ds}(m)$, $a_{os}(m)$, and $a_{ps}(m)$, respectively. For example, say there are M=4 transmit antennas 14 and the data signals are transmitted from antennas 2 and 4 of the transmitter 12. Further, say that all of the other signals are transmitted from antenna 1, and that 15% of the total transmitter power is allocated to pilots with 5% on each of antennas 1 and 2 and 2.5% on each of antennas 3 and 4. In this case, $a_{ds}$=[0 1/2 0 1/2], where the factor of 1/2 accounts for the fact that the data signal power is divided equally across the two currently selected ones of the transmit antennas 14. Furthermore, $a_{os}$=[1 0 0 0] and $a_{ps}$=[1/3 1/3 1/6 1/6]. By definition, the sum of the elements of each power distribution vector is unity.

One may now write the SINR for the n th stage of the SIC G-RAKE receiver circuit 38, which is denoted as $\rho(n)$. This value represents the true SINR that the receiver 16 attempts to estimate in support of its channel quality feedback obligation. The n th stage is associated with a particular one of the transmit antennas 14, whose index is denoted as $m_n$. For example, if transmit antennas 2 and 4 are selected for data transmission, there are two stages to the SIC G-RAKE receiver circuit 38. Assuming that the ordering is such that the data stream on antenna 2 is decoded first and that on antenna 4 is decoded second, the antenna index for stage-1 is $m_1$=2 and that for stage-2 is $m_2$=4. With this notation, the per-chip SINR per-code for some arbitrary antenna selection at the transmitter 12 is given by $$\rho(n) = \left(\frac{\beta_{ds/ps}}{K}\right)\left(\frac{a_{ds}(m_n)}{N_p a_{ps}(m_n)}\right) \tilde{h}_{m_n}^\dagger \tilde{R}^{-1}(n) \tilde{h}_{m_n} \qquad \text{Eq. (5)}$$

where, as in Eq. (3), K is the number of multi-codes allocated to the data channel (reused across active antennas) and N is the spreading factor used for the pilot channels, e.g., $N_p$=256 in the WCDMA standard. However, $\tilde{h}_{m_n}$ is the net response vector corresponding to the m th transmit antenna for the nth stage of the SIC G-RAKE receiver circuit 38, and $\tilde{R}(n)$ is the impairment covariance matrix corresponding to the n th stage. The tilde notation for $\tilde{h}_{m_n}$ and $\tilde{R}(n)$ is used to emphasize the fact that the channel tap gains (on which the net response and impairment covariance depend) are scaled by the pilot energy per symbol. The net response and impairment covariance are expressed in this way since they are, in this embodiment, formed parametrically using channel estimates obtained from the despread pilot symbols which implicitly contain this scaling.

In more detail, the impairment covariance matrix for the n th stage is given by $$\tilde{R}(n) = \tilde{R}_{ds}(n) + \tilde{R}_{os} + \tilde{R}_{oc} \qquad \text{Eq. (6)}$$

where $\tilde{R}_{ds}(n)$ captures the interference due to the data channel, $\tilde{R}_{os}$ captures the interference due to the other channels, and $\tilde{R}_{oc}$ captures the combination of other-cell interference and noise. If the other-cell interference can be approximated as white, then, as previously noted, $\tilde{R}_{oc}$ is a diagonal matrix given by $\tilde{R}_{oc} = N_o R_{pulse}$.

The impairment covariance matrix is split into several terms to reflect the fact that the data signal and the other signals traverse different fading channels between the transmitter 12 and the receiver 16, and that SIC is applied to the data signal only, thus $\tilde{R}_{ds}(n)$ is a function of the stage index n. The expression in Eq. (6) implicitly assumes that pilot subtraction is performed in the SIC G-RAKE receiver circuit 38, thus there is no interference component due to the pilots. Pilot impairment correlations in the form of a pilot impairment covariance matrix, $\tilde{R}_{ps}$, can be included if needed.

The other signal portion of the impairment covariance matrix is given by $$\tilde{R}_{OS} = \beta_{OS/ps} \sum_{m=1}^{M} \left( \frac{a_{OS}(m)}{N_p a_{ps}(m)} \right) \tilde{R}_m \qquad \text{Eq. (7)}$$

where $\tilde{R}_m$, defined in Eq. (9) below, captures the interference due to Inter-Symbol Interference (ISI) and Multiple Access Interference (MAI) from the m th transmit antenna. The data-signal portion of the impairment covariance matrix taking into account SIC is given by $$\tilde{R}_{ds}(n) = \qquad \text{Eq. (8)}$$

$$\beta_{ds/ps} \left[ \left( \frac{N_s}{K} \right) \sum_{\substack{m=1 \\ m \neq mn \\ m \notin A(n)}}^{M} \left( \frac{a_{ds}(m)}{N_p a_{ps}(m)} \right) \tilde{h}_m \tilde{h}_m^\dagger + \sum_{\substack{m=1 \\ m \notin A(n)}}^{M} \left( \frac{a_{ds}(m)}{N_p a_{ps}(m)} \right) \tilde{R}_m \right]$$

Here A(n) denotes the subset of active transmit antennas at the n th stage for which the data interference has already been cancelled. The first term of this expression captures the interference due to code-reuse that has not yet been cancelled, and is scaled by the spreading factor used for the data channel, i.e., $N_s = 16$ for HSDPA. The second term is due to ISI/MAI from the transmit antennas yet to be cancelled. The elements of the ISI/MAI matrix $\tilde{R}_m$ are given by $$\tilde{R}_m(q_1, q_2) = \qquad \text{Eq. (9)}$$

$$\sum_{P_1=1}^{P} \sum_{P_2=1}^{P} \tilde{g}_{lmp_1} \tilde{g}_{lmp_2}^* \sum_{\substack{k=-\infty \\ k \neq 0}}^{\infty} x(kT_c + \tau_{q_1} \tau_{lmp_1}) x^*(kT_c + \tau_{q_2} - \tau_{lmp_2})$$

The goal is for the receiver 16 to first estimate and then to report quantized versions of the SINR ρ(n) for one or more stages 40 of the SIC G-RAKE receiver circuit 38, for one or more different transmit antenna selections, i.e., for one or more desired subsets of the transmit antennas 14. Thus, a key part of this estimation is for the receiver 16 to estimate the SINR as if it was being served from each subset of transmit antennas 14 for which it reports channel quality estimates. The reported channel qualities will be used at the transmitter 12 in scheduling users (i.e., the receiver 16 and other such receivers being served on the HSDPA signal being transmitted by the transmitter 12). Thus the SINR estimates from the receiver 16 should not be affected unduly by the current antenna selection at the transmitter 12. That is, the best transmit antenna selection for the receiver 16 likely is not the current transmit antenna selection, which is being used to serve another user.

With this point in mind, recall that the data signal transmit antenna power distribution $a_{ds}$ is a function of the antenna selection. Since the receiver 16 reports the SINRs for one or more desired antenna selections, it has knowledge of $a_{ds}$, and may be configured to assume uniform power distribution across the selected transmit antennas, for a given total data signal power allocation at the transmitter 12—i.e., whatever transmit power is being used in the aggregate to transmit the data signal, such power splits evenly among whatever subset of the transmit antennas 40 is under consideration.

With this approach, the receiver 16 avoids the influence of the currently transmit antenna selection forming the impairment covariance matrix $\tilde{R}(n)$ and the net response vector $\tilde{h}_m$ parametrically and calculating the SINR ρ(n) directly through Eq. (5). This channel quality estimation is done for one or more transmit antenna selections, $a_{ds}$, for which the receiver 16 wishes to report SINRs. For example, the receiver 16 may calculate SINRs for a variety of antenna selections and choose the best one or more on which to report. "Best" may mean the antenna selection(s) that maximize either the SINRs themselves, or some function of the SINRs, e.g., data rate. Of course, in tandem with the SINR reports, the receiver 16 generally must feed back the antenna selection(s) to which the SINR(s) correspond, so that the transmitter 12 can select the proper subset of transmit antennas 14 from which to transmit the data signal to the receiver 16 at the receiver's next scheduled time.

The first step in channel quality estimation is for the receiver 16 to estimate the channel tap delays $\tau_{lmp}$, which may be done through conventional path-searching techniques. The next step is to estimate the scaled channel tap gains $\tilde{g}_{lmp}$ by despreading the pilot channel from each transmit antenna and using knowledge of the pilot symbol patterns. Because the despread pilot values are always scaled by the pilot symbol energy, the estimated channel tap gains are scaled implicitly, which complements calculating the parametric forms for the net response and impairment covariance matrix in Eq. (1) and Eq. (6).

With estimates of the tap gains and delays thus computed, the net response vector $h_m$ in Eq. (1) may be calculated directly for a given set of finger locations (the $\tau_q$'s). The ISI/MAI portion of the impairment covariance matrix, i.e., $\tilde{R}_m$ in Eq. (9), also may be calculated directly for the chosen finger locations.

The remaining parameters necessary for computing channel quality estimates at the receiver 16, i.e., computing τ(n) values, are the following:

the data-to-pilot signal transmit power ratio $\beta_{ds/ps}$ and the number of multi-codes K;

the other-to-pilot signal transmit power ratio $\beta_{os/ps}$ and the other signal power distribution $a_{os}$;

the pilot signal transmit antenna power distribution $a_{ps}$; and the other-cell interference impairment correlations $R_{oc}$.

Regarding the first item in the bullet list, in at least one embodiment, the receiver 16 uses previously agreed-upon or nominal values for $\beta_{ds/ps}$ and K. Because the SINR τ(n) varies linearly with both of these parameters, the transmitter 12 may scale the SINR(s) reported by the receiver 16 by the actual values used by it at the time of scheduling.

In another embodiment, the transmitter signals the actual data-to-pilot signal transmit power ratio $\beta_{ds/ps}$ in the forward link, and the receiver 16 is configured to receive such signaling information. As long as the data-to-pilot signal transmit power ratio does not change significantly over the selected signaling delay, i.e., between signaling updated values, this approach would yield good accuracy. Of course, the number of codes, K, also may be a signaled value.

The WCDMA standard already includes a provision for signaling the data-to-pilot signal transmit power ratio, but it commonly is not signaled very often. One reason for signaling the data-to-pilot signal transmit power ratio more frequently is that it simplifies the estimation of the other-to-pilot signal transmit power ratio $\beta_{ds/ps}$ at the receiver 16, as will be described later. With transmitter-to-receiver signaling provisions assumed, it may be assumed that the receiver 12 has knowledge of the actual value of $\beta_{ds/ps}$ in the below calculations.

Regarding the second item in the above list, it may be assumed that the transmitter 12 transmits forward link signaling to the receiver 16, that includes the other-to-pilot signal transmit power ratio, $\beta_{os/ps}$ and that the receiver 16 is configured to receive such values via transmitter signaling. Such signaling simplifies channel quality estimation at the receiver 16, at the expense of increased forward link signaling by the transmitter 12.

In an alternative embodiment, the transmitter 12 does not signal the other-to-pilot signal transmit power ratio $\beta_{os/ps}$, and the receiver 16 is configured to estimate the ratio. In support of such estimation, the transmitter 12 could be configured to signal the other signal transmit antenna power distribution, $a_{os}$, to the receiver 16. Since the distribution commonly does not change frequently, or at all, the distribution may be signaled infrequently, or even once, such as at call setup. For example, if the transmitter 12 is configured such that all other signal power is transmitted from antenna 1 of the transmit antennas 14 all of the time, then $a_{os}(m)=1$ for m=1 and 0 otherwise. The below calculations thus assume that the receiver 16 knows the other signal transmit antenna power distribution, whether by assuming a default value for it, or by receiving it via signaling from the transmitter 12.

Regarding the third item in the above bullet list, we assume that the pilot signal transmit antenna power distribution $a_{ps}$ is also known to the receiver 16. Because this value typically does not change over time, the distribution may be signaled from the transmitter 12 to the receiver 16 once at call setup. Alternatively, $a_{ps}$ could be assumed as a default value, or could be estimated through very long term averaging.

Regarding the fourth item in the above bullet list, the receiver embodiment currently being discussed is configured to assume that the other-cell interference is approximately white. Thus, the other cell impairment correlations can be expressed as $R_{oc}=N_o R_{pulse}$ where $N_o$ is the power spectral density of the noise plus other-cell interference. Since $N_o$ generally is unknown, the receiver 16 is configured to estimate it, in support of impairment correlation calculations and channel quality estimations. Any number of noise estimation methods may be implemented in the receiver 16, but two advantageous methods, one based on a Maximum Likelihood (ML) approach and one based on a maximum Eigenvector approach, are detailed later herein.

With the above estimations, default assumptions, and/or signaling in mind, it may be seen that, in at least one embodiment, the receiver 16 has everything needed for channel quality estimation, except for $N_o$ and $\beta_{os/ps}$.

The receiver 16 may be configured to estimate $\beta_{os/ps}$ by, as a first step, estimating a covariance matrix based on chip samples of the received (composite) signal prior to despreading. This covariance matrix may be denoted as $R_r$. The chip-sample covariance matrix is of the same dimension as the impairment covariance matrix $\tilde{R}(n)$. Moreover, the delays of the received signal used in computing $R^r$ are the same as those used to estimate $\tilde{R}(n)$. The estimate is obtained simply by averaging the outer product of the vector r(i) of delayed chip samples over many positions within a given window of time, such as within a single W-CDMA Transport Time Interval (TTI), i.e., $$\hat{R}_r = \frac{1}{N}\sum_{i=1}^{N} r(i)r^\dagger(i) \qquad \text{Eq. (10)}$$

Because there are a large number of chip samples in one TTI, a very good estimate of $R_r$ may be obtained. Other embodiments of the receiver 16 may use other approaches to obtain the average as well, e.g., sliding window, exponential weighted average, etc.

Regardless, the true value for the chip-sample covariance matrix is given by $$R_r = \frac{1}{N_p}\sum_{m=1}^{M} \alpha_{T/P}(m)\tilde{R}'_m + R_{OC} \qquad \text{Eq. (11)}$$

where $\alpha_{T/P}(m)$ is called the traffic-to-pilot ratio and is defined as the ratio of the aggregate matrix $\tilde{R}'_m$ has the same form as $R_m$ defined in Eq. (9). The only data, other, and pilot power on the m th antenna to the pilot power on the m th antenna. The difference is that in the inner summation in Equation Eq. (9), the k=0 term should not be excluded. This variation arises because there is no notion of code orthogonality prior to despreading.

The receiver 16 may be configured to estimate the other-to-pilot signal transmit power ratio $\beta_{os/ps}$, based on expressing the chip-sample covariance matrix in Eq. (11) in the following equivalent form $$R_r = \frac{1}{N_p}\sum_{m=1}^{M}\left[\beta_{ds/ps}\left(\frac{\bar{a}_{ds}(m)}{a_{ps}(m)}\right) + \beta_{os/ps}\left(\frac{a_{os}(m)}{a_{ps}(m)}\right) + 1\right]\tilde{R}'_m + R_{oc} \qquad \text{Eq. (12)}$$

In the above formulation, $R^r$ is a function of the other-to-pilot signal transmit power ratio $\beta_{os/ps}$ to be estimated. When the receiver 16 estimates the chip-sample covariance matrix, the result is a function of the current data signal transmit antenna power distribution vector, denoted $\bar{a}_{ds}$, which is not necessarily the same as that corresponding to the transmit antenna selection(s) on which the receiver 16 wishes to report SINRs. Consequently, for the purposes of the estimation of $\beta_{os/ps}$, $\bar{a}_{ds}$ is treated as an unknown and thus is estimated.

For purposes of estimation, the receiver 16 can be configured to model the other cell interference as white, i.e., $R_{oc}=N_o R_{pulse}$. Strictly speaking, the noise level $N_o$ generally is unknown, but the receiver 16 can avoid excessively large search spaces by treating the noise level as known. An initial estimate of the noise level can be obtained using either of the two independent approaches described in the next two subsections. A refined estimate of the noise level may be obtained in an iterative manner by first forming a ML estimate of $\beta_{os/ps}$ and $\bar{a}_{ds}$ using the initial estimate of $N_o$. Then these two parameters may be treated as known values, and the ML estimation may be repeated, except this time treating $N_o$ as unknown. This iterative process may be repeated by the receiver 16 as many times as desired to refine the estimates of both $\beta_{ds/ps}$ and $N_o$.

To estimate the other-to-pilot signal transmit power ratio using an ML approach, the receiver 16 may define the log-likelihood ratio (to be maximized) as $l(\bar{a}_{ds},\beta_{os/ps})=\log p(r|\bar{a}_{ds},\beta_{os/ps})$ where $$r=[r(1)r(2)\ldots r(N)]^T \qquad \text{Eq. (13)}$$

is the concatenation of N vectors of delayed chip samples at different positions within the TTI. The processing may assume that r(i) is a zero-mean complex Gaussian random vector with covariance matrix $R_r$. A further assumption is that the r(i) values are spaced far enough apart that $E[r(i)r^\dagger(j)]=0$ for $i \neq j$. With these assumptions, the log-likelihood ratio is given by $$l(\bar{a}_{ds},\beta_{os/ps})=-tr[R_r^{-1}\hat{R}_r]-tr[\log(0.5R_r)] \qquad \text{Eq. (14)}$$

where tr[A] is the matrix trace and log(A) is the matrix log, not the log of the elements of A. In this expression, $R_r$ is calculated through Eq. (5) using channel estimates in the parametric form for $\tilde{R}'_m$. The sample covariance matrix $\hat{R}_r$ is estimated through Eq. (10).

In order to maximize the log-likelihood ratio, $l(\bar{a}_{ds},\beta_{os/ps})$ must be calculated for all possible values of the hypothesis $\{\bar{a}_{ds},\beta_{os/ps}\}$. The power distribution vector $\bar{a}_{ds}$ is discrete, and thus takes on only a finite number of values, $2^M$ to be exact. The other hypothesis, $\beta_{os/ps}$ is continuous, so it may be quantized to limit it to a finite number of values. Finer quantizations require larger search spaces, indicating a trade-off in complexity versus accuracy. The desired result of the maximization is the most likely value of $\beta_{os/ps}$, but in the process the current antenna selection $\bar{a}_{ds}$ is also obtained. As already mentioned, this is not required for channel quality reporting (e.g., SINR reporting) by the receiver 16, since the receiver 16 generally forms impairment covariance matrices based on the antenna selections $a_{ds}$ it chooses.

Knowing the data-to-pilot signal transmit power ratio $\beta_{ds/ps}$ from forward link signaling reduces the complexity of the ML estimation of $\beta_{os/ps}$, because, if the data-to-pilot signal transmit power ratio was not known, then the hypothesis would be of a higher dimension, and the search space would become much larger. Conceptually this is not a problem, and the receiver 16 could use the above formulation to estimate $\beta_{ds/ps}$ if it was not a known value.

It thus remains the receiver's task to make a working estimation of the noise level $N_o$. A number of approaches might be used, but the methods disclosed herein include two advantageous approaches to the required noise estimation. Both approaches are based on the estimated chip-sample covariance matrix $\hat{R}_r$. The first is a least squares (LS) solution using the form of the chip-sample covariance matrix in Eq. (11). In this approach, the receiver 16 replaces $R_r$ on the left-hand side with its estimate $\hat{R}_r$ and models the other-cell interference as white such that $R_{oc}=N_oR_{pulse}$. Furthermore, $\tilde{R}'_m$ on the right-hand side is calculated using channel estimates in the parametric form for this matrix in Eq. (9).

The result is a system of many equations with only M+1 unknowns, i.e., the M traffic-to-pilot ratios $\alpha_{T/P}(m)$ and the noise level $N_o$. This system may be expressed as Ax=b, where $$x=[\alpha_{T/P}(1)\alpha_{T/P}(2)\ldots \alpha_{T/P}(M)N_o]^T \qquad \text{Eq. (15)}$$

is the vector of unknowns. The n th element of the vector b is given by the (p,q) th element of the matrix $\hat{R}_r$, and the n th row of the matrix A is given by $$A_n = \frac{1}{N_p}[\,\tilde{R}'_1(p,q)\ \ \tilde{R}'_2(p,q)\ \ \ldots\ \ \tilde{R}'_M(p,q)\ \ N_p\delta(p-q)\,] \qquad \text{Eq. (16)}$$

where $\tilde{R}'_m(p,q)$ is the (p,q)th element of $\tilde{R}'_m$ and $\delta(\cdot)$ is the delta function. The LS solution to the system of equations is $$\hat{x}(A^\dagger A)^{-1}A^\dagger b \qquad \text{Eq. (17)}$$

There is significant freedom in choosing the elements of the matrices to form A and b. The minimum number of elements that may be used is M+1 to ensure that there is a solution to the system of equations. However, using significantly more leads to better noise averaging. One example would be to choose the elements corresponding to the first few diagonals of each $\tilde{R}'_m$. Only the main diagonal and upper diagonals provide useful equations, since $\tilde{R}'_m$ is Hermitian.

Noise level estimation using the LS approach tends to bias the estimate, with the bias being particularly evident at high Signal-to-Noise Ratios (SNRs), where the noise level is small relative to the traffic-to-pilot ratios and the estimate of $N_o$ "absorbs" a relatively large amount of noise due to the imperfect channel estimates used to calculate $\tilde{R}'_m$. The result is a positive bias (overestimate of noise level) that is an increasing function of SNR. The bias function depends on the variance of the channel estimation error, and the type of channel itself. If the statistics of the bias are known for a given environment, then the receiver 16 can improve the noise level estimate by applying a correction factor to the estimate that reduces the bias. For example, the correction factor could be a certain percentile of the random bias. It is better from a CQI reporting perspective to choose the percentile such that the noise level is still slightly over estimated so that the final SINR estimate reported by the receiver 16 is slightly underestimated. In this way the link adaptation process at the transmitter 12 will not end up being overly aggressive, thus avoiding an excessive number of retransmissions from the transmitter 12 to the receiver 16.

A second approach that may be implemented in the receiver 16 bases noise estimation on the calculation of the Eigen values of the estimate of the chip-sample covariance matrix $R_r$. As long as the dimension of $R_r$ is much greater than M, the largest Eigen values correspond to the signal component, and the smallest ones to the noise component. Consequently, an estimate of the noise level is simply the minimum Eigen value of the estimated chip-sample noise covariance matrix $\hat{R}_r$. Alternatively, the estimate may be improved in some cases by averaging a number of the smallest Eigenvalues.

In a partial parametric approach to channel quality estimation, as opposed to the fully parametric approach outlined thus far, wherein parametric forms for own-cell and other-cell interference were used to form the impairment correlations, only that part of the impairment correlations arising from data signal interference is represented in parametric form. Those portions of the other signals in the same cell and the other-cell signals are non-parametric, in the sense that measured values are used in the impairment correlation estimations.

In this partial parametric approach, the covariance matrix of the received chip samples prior to despreading is first estimated. Alternatively, an impairment covariance matrix may be estimated using despread pilot symbols. However, the former is less noisy, since there are many more chip samples in one TTI than there are pilot symbols to use for forming the estimate. Either way, since the portion of the covariance matrix due to the data channel is affected by the currently selected transmit antenna subset, that portion is removed leaving the impairment due only to the other signals, the pilot signals, and the other-cell interference. If pilot subtraction is used at the receiver 16, then the impairment due to pilots may be removed as well. The resulting impairment covariance matrix is then augmented by adding back in a portion that is due to each possible transmit antenna subset for which the receiver 16 wishes to report CQIs.

Assuming that SIC is employed by the receiver 16 for the data channel, the augmentation is handled differently for each stage 40 of the SIC G-RAKE receiver circuit 38. Use of parametric forms of the impairment covariance matrix that can be calculated using estimates of the channel coefficients and delays enables such augmentation. Once the augmented impairment covariance matrices are formed, the SINR for each stage 40 of the SIC G-RAKE receiver circuit 38 is calculated.

One advantage of this approach is that it implicitly captures the color of the other-cell interference. This is desirable from an interference cancellation viewpoint, since the SIC G-RAKE receiver circuit 38 is able to exploit the color and partially suppress the other-cell interference. Note, too, that the removal of the impairment correlation component due to the current transmit antenna selection should be intentionally biased to avoid "over-subtraction" which can lead to a negative definite impairment covariance matrix in some cases.

In more detail, the receiver 16 removes the influence of the transmit antennas 40 that are active for the currently scheduled receiver from the estimate of the chip sample covariance matrix $R_r$. The receiver 16 then augments the result by adding back components due to the transmit antenna selection(s) for which it wishes to report SINRs.

In better understanding this approach, one may start by considering the form for $R_r$ contained in Equation Eq. (12). Notice that this equation is a function of the matrix $\tilde{R}'_m$. In contrast, the impairment covariance matrix in Equation Eq. (6), which was required for calculating SINR in terms of $\tilde{R}_m$, does not include the "k=0" term due to the use of orthogonal spreading codes (see Equation Eq. (9)). However, one may rewrite Equation Eq. (12) in terms of $\tilde{R}_m$ by extracting the "k=0" term as follows $$R_r = \frac{1}{N_p}\sum_{m=1}^{M} \alpha_{T/P}(m)\tilde{h}_m\tilde{h}_m^\dagger + \qquad \text{Eq. (18)}$$

$$\frac{1}{N_p}\sum_{m=1}^{M}\left[\beta_{ds/ps}\left(\frac{\bar{a}_{ds}(m)}{a_{ps}(m)}\right) + \beta_{os/ps}\left(\frac{a_{os}(m)}{a_{ps}(m)}\right) + 1\right]\tilde{R}_m + R_{oc}$$

To remove the influence of the current antenna selection (as well as the pilots), the receiver 16 can be configured to perform the following subtraction $$R_{os,oc} = \qquad \text{Eq. (19)}$$

$$R_r - \frac{1}{N_p}\sum_{m=1}^{M}\alpha_{T/P}(m)\tilde{h}_m\tilde{h}_m^\dagger - \frac{1}{N_p}\sum_{m=1}^{M}\left[\beta_{ds/ps}\left(\frac{\bar{a}_{ds}(m)}{a_{ps}(m)}\right) + 1\right]\tilde{R}_m$$

$$= \beta_{os/ps}\sum_{m=1}^{M}\left(\frac{a_{os}(m)}{N_p a_{ps}(m)}\right)\tilde{R}_m + R_{oc} \qquad \text{Eq. (20)}$$

Note that if there are no voice and "other" signals to consider in Eq. (20), then there will be no $\beta_{os/ps}$ term, and the equation would reduce to the $R_{oc}$ term.

In practice, $R_{os,oc}$ may be estimated by the receiver 16 using Equation Eq. (19), because estimates of all of the parameters are known. Specifically, the data-to-pilot signal transmit power ratio $R_{os,oc}$ may be known through forward link signaling; the current antenna selection $\bar{a}_{ds}$ may be estimated using the ML approach described previously; and the traffic-to-pilot ratio $\alpha_{T/P}(m)$ may be estimated using the LS approach described previously. Furthermore, an estimate of $R_r$ is obtained by the time averaging of Eq. (10).

Comparing the ideal expression for $R_{os,oc}$ in Equation Eq. (20) with Equation Eq. (6), one sees that in order to form the required impairment covariance matrix—and thus estimate SINR—the receiver 16 needs only to add $\tilde{R}_{ds}(n)$ defined in Equation Eq. (8) to the estimate of $R_{os,oc}$ obtained through Equation Eq. (19). This approach is partially-parametric in the sense that the parametric forms for $\tilde{R}_s(n)$ and the subtracted terms in Equation Eq. (19) are used to construct the impairment covariance matrix, but a non-parametric form for the other signal plus other-cell interference component $R_{os,oc}$ is used. One advantage of this technique is that the non-parametric form of $R_{os,oc}$ captures any potential color in the other-cell interference, in contrast to the fully parametric approach where the other-cell interference was modeled as white. Capturing noise color is desirable from an interference cancellation viewpoint, because the receiver 16 may be configured to exploit knowledge of noise color and partially suppress the other-cell interference. For example, the SIC G-RAKE circuit 38 is one type of receiver architecture that can exploit noise coloration in its interference suppression by incorporating knowledge of noise coloration into its RAKE combining weight generation.

One point to note with the partially parametric approach is that the estimation error in the traffic-to-pilot ratios $\alpha_{T/P}(m)$ can lead to an over subtraction of the $\tilde{h}_m\tilde{h}_m^\dagger$ terms in Equation Eq. (19) which can cause the estimate of $R_{os,oc}$ to become negative definite in some cases, particularly by scaling this term by a value less than one. Thus, the value needs to be small enough such that $R_{os,oc}$ is positive definite, but not too small that it causes excessive errors in the estimated SINR.

Figure 8:
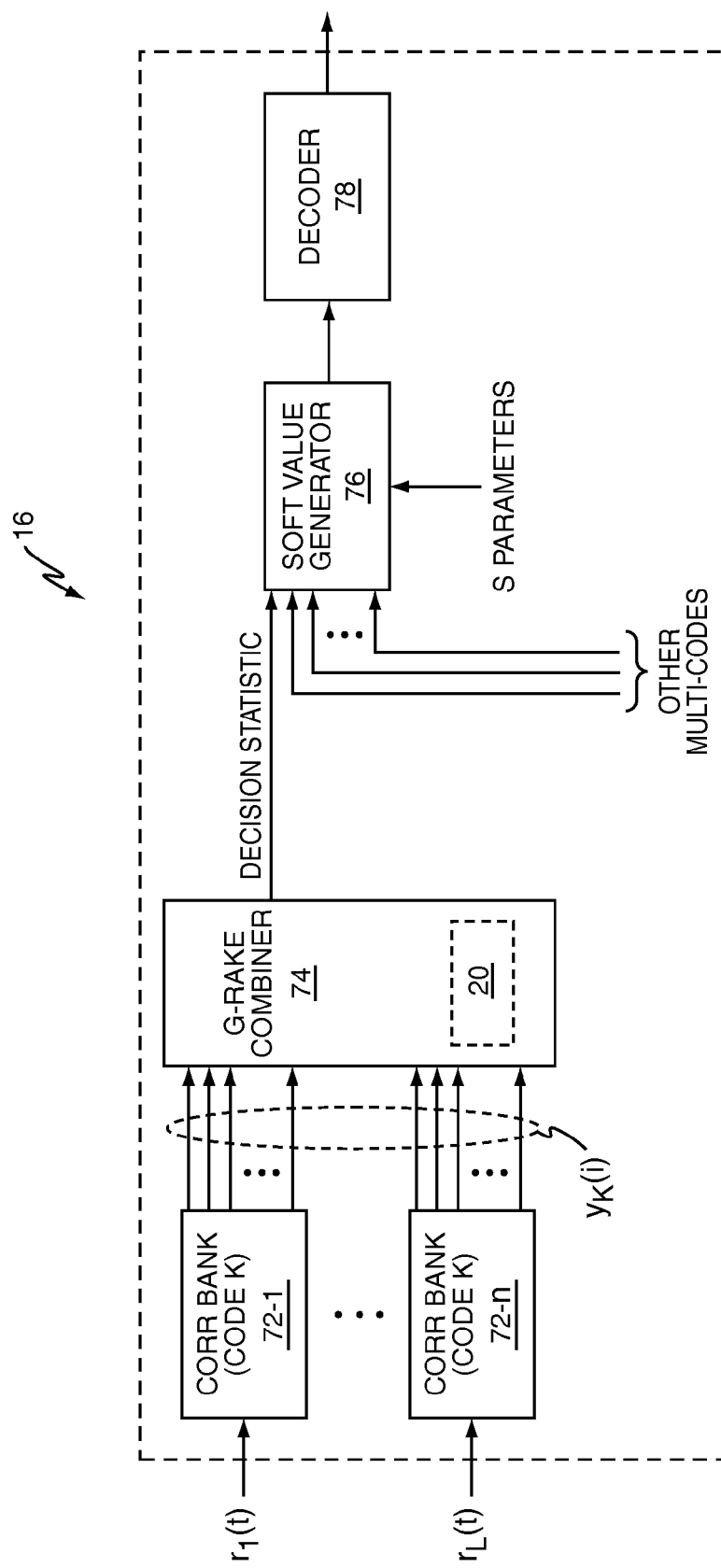
FIG. 8 is a block diagram of a G-RAKE embodiment of the wireless communication receiver of FIG. 1 configured for minimum mean square error symbol detection or joint symbol detection.

While at least some of these and other details are presented in the context of a SIC G-RAKE architecture, those skilled in the art will appreciate that channel quality estimation as taught herein can be applied to a variety of receiver architectures. For example, FIG. 8 illustrates a G-RAKE based receiver circuit 70 that may be implemented in the receiver 16. More particularly, the illustrated circuit 70 may be configured to support different kinds of receivers. For example, MMSE-based RAKE operations or joint detection RAKE operations may be supported. As noted earlier for MMSE detection, the receiver 16 is configured to detect code symbols transmitted during the same symbol time on an individual basis, while treating all other code symbols as (colored) noise, and, for joint detection, the receiver 16 is configured to detect code symbols of the same code transmitted during the same symbol time on a joint detection basis, while treating all other code symbols as noise.

In the illustrated embodiment, the circuit 70 comprises a number of correlator banks 72-1 through 72-n to generate despread values from one or more composite received signals $r_I(t)$ through $r_L(t)$ (for L receive antennas), a G-RAKE combiner 74 to RAKE combine despread values from the correlator banks 72 and that includes or is associated with the one or more processing circuits 20, to enable channel quality estimation as taught herein, a soft value generator 76 to generate soft values from the RAKE combined values output by the G-RAKE combiner 74, and a decoder 78 to produce hard decision values from the soft values output by the soft value generator 76.

Assuming data signals transmitted from all antennas 14, the despread vector output from the correlator banks 72 may be expressed as $$y_k(i) = Hc_k(i) + x_k(i) \quad \text{Eq. (21)}$$

where the vector $c_k(i) = [c_{1k}(i), c_{2k}(i), \ldots, c_{Mk}(i)]^T$ contains the m symbols during the ith symbol period that share the same multi-code being used on the data channel signal(s) being transmitted from the transmitter 12. The Q×M gain matrix $H = [h_1, h_2, \ldots, h_M]$ describes the MIMO (or MISO) channel in full, where each gain vector $h_m$ describes the channel between the mth transmitter antenna and the (possibly multi-antenna) receiver 16. The vector $x_k(i)$ describes the impairment process consisting of ISI, MAI, and noise. In practice, the MAI also includes other signal channels (voice, control, etc.), and pilots. The impairment covariance matrix, which captures impairment correlations across the RAKE fingers, is denoted as $R_x = E[x_k(i)x_k^\dagger(i)]$.

The M-dimensional decision statistic $z_k(i)$ output from the G-RAKE combiner 74 is generated by weighting the despread vector as $z_k(i) = W^\dagger y_k(i)$. For a JD implementation, the G-RAKE weight matrix is given by $W = W_{JD} = R_x^{-1} H$. The matrix $S = H^\dagger R_x^{-1} H$ is analogous to the s-parameters in MLSE-type receivers. For an MMSE implementation, the weight matrix is expressed as $$W = W_{MMSE} = [HH^\dagger + R_x]^{-1} H = [h_m h_m^\dagger + R_{x,m}]^{-1} H \quad \text{Eq. (22)}$$

where, in the latter equality, one may redefine the impairment covariance matrix as $$R_{x,m} = \sum_{\substack{n=1 \\ n \neq m}}^{M} h_n h_n^\dagger + R_x \quad \text{Eq. (23)}$$

The weight vector corresponding to the MMSE estimate of symbol $c_{mk}(i)$ is denoted as $W_{MMSE,m}$, and is simply the mth column of $W_{MMSE}$. As far as this symbol is concerned, it "sees" an impairment with covariance matrix $R_{x,m}$, with the extra term in $R_{x,m}$ due to signals sharing the same code. In contrast to the JD G-RAKE implementation of the circuit 70, the MMSE G-RAKE implementation of circuit 70 treats these signals as interference to be suppressed, rather than jointly detecting them.

In both JD and MMSE implementation, the impairment covariance matrix $R_x$ may be calculated in consideration of the transmit power ratios, transmit power distributions, and the different fading paths. As such, the impairment covariance matrices used in JD and MMSE implementations of the receiver 16 provide an advantageous basis for channel quality estimation as taught herein.

In further variations, the receiver 16 may operate in the context of transmitter systems that do not employ transmit antenna selection. In such cases, it is not necessary to remove the influence of the current transmit antenna selection when estimating SINRs, because the scheduled transmit antenna selection in the future will be the same as that at the time of reporting. This fact simplifies both the full parametric and partial parametric CQI estimation approaches described in detail herein. Specifically, the ML estimation of the other-to-pilot signal transmit power ratio is simplified in that the current antenna selection $\bar{a}_{ds}$ is known, thus the size of the search space is reduced significantly. On that point, for systems 10 with dynamic transmit antenna selection, at least one embodiment of the transmitter 12 uses forward link signaling to provide the receiver 16 with the current transmit antenna selection, thereby simplify the ML estimation of the other-to-pilot signal transmit power ratio at the receiver 16.

Yet another way of simplifying CQI estimation at the receiver 16 is to configure the transmitter 12, such that it schedules the same receiver for several consecutive service intervals (e.g., TTIs) using the same transmit antenna selection each time. In this case the non-scheduled receivers would need to estimate the current transmit antenna selection $\bar{a}_{ds}$ during the first TTI, but would not need to estimate it again until the scheduled receiver changes.

In the partial parametric approach, it is possible to use the impairment covariance matrix estimated from the despread pilot values instead of the data covariance matrix estimated from received chip samples prior to despreading. This alternative simplifies the estimation of $R_{os,oc}$ in Equation Eq. (19), in that knowledge of the traffic-to-pilot ratios $\alpha_{T/P}(m)$ is not required. This is because the $\tilde{h}_m \tilde{h}_m^\dagger$ terms do not appear after despreading the pilots, as the pilot codes on different ones of the transmit antennas 40 are orthogonal. The trade-off is that the impairment covariance matrix after despreading is noisier than the data covariance matrix prior to despreading, because there are many fewer pilot symbols over which to average than there are chip samples.

Similar to the above approach, the impairment covariance matrix could be estimated through despreading a code that is not used by the transmitter 12. Again, estimation of the traffic-to-pilot ratios would not be required. If the unused codes are of small spreading factor, the resulting covariance matrix may be less noisy than that obtained by despreading the pilot codes. Additionally, if there are several unused codes, the estimated impairment covariance matrix could be averaged over these codes in order to reduce the noise even more.

An alternative to explicitly estimating the noise level $N_o$ is to use some agreed-upon nominal value since the level of other-cell interference power does not change significantly with movement of the receiver 16 in its current radio cell. Another approach is to use an opportunistic estimate of the noise level, i.e., when the estimated SINR is very low, the noise level estimate may be quite good since the bias in the estimate is reduced at lower SNRs. If the receiver 16 is configured to keep track of the SINRs estimated over time, then it can choose the noise level estimate opportunistically. In some cases the level of other-cell interference remains fairly stable, because the level is an average from many transmitters (e.g., radio base stations in a cellular communication network), thus this approach can offer reasonable accuracy.

Also, rather than modeling the other-cell interference as white in the full-parametric approach, some fixed model for a non-diagonal $R_{oc}$ could be used. For example, this fixed model could be designed to be channel independent, and thus would capture the "average color" due to the chip pulse shape.

Thus, with the foregoing in mind, it will be understood that the receiver 16 is configured to determine impairment correlations for the received signal in consideration of the different fading paths, signal types, and transmit power allocations, associated with complex transmission and reception environments, such as MIMO. More particular, the foregoing discussion presented a full parametric embodiment for determining the various components of the impairment correlation matrix $\tilde{R}$, and a partial parametric embodiment. For both the full and partial parametric approaches, the goal is to form the impairment covariance matrix for the nth stage of the receiver 16-n may equal one—which is given in Eq. (6), and repeated below as $$\tilde{R}(n)=\tilde{R}_{ds}(n)+\tilde{R}_{os}+\tilde{R}_{oc} \qquad \text{Eq. (24)}$$

where $\tilde{R}_{ds}(n)$ is given in Eq. (8). In both the full approaches, all quantities in Eq. (8) are assumed to be known, either at system setup, through forward link signaling, or by using nominal values. Thus, this part of the impairment covariance matrix may be calculated directly using the known net response vectors $\hat{h}_m$ in Eq. (1) and the known ISI/MAI matrix $\tilde{R}_m$ given in Eq. (9). Both $\hat{h}_m$ and $\tilde{R}_m$ are calculated based on channel estimates. Where the two approaches differ is how $\tilde{R}_{os}$ and $\tilde{R}_{oc}$ are calculated.

In the full parametric approach, the receiver 16 is configured to form $\tilde{R}_{os}$ and $\tilde{R}_{oc}$ directly from their formulas, hence the name "full parametric." The equation governing $\tilde{R}_{os}$ is Eq. (7), i.e., $$\tilde{R}_{os} = \beta_{os/ps} \sum_{m=1}^{M} \left( \frac{a_{os}(m)}{N_p a_{ps}(m)} \right) \tilde{R}_m \qquad \text{Eq. (25)}$$

In this approach, the other-cell interference is modeled as white, thus $\tilde{R}_{oc}$ is given by $$R_{oc}=N_o R_{pulse}. \qquad \text{Eq. (26)}$$

Everything in these equations is assumed to be known except for the other-to-pilot signal power ratio $\beta_{os/ps}$ and the other-cell interference power $N_o$. Once these are estimated, these parts of the impairment covariance matrix may be calculated directly.

As a review of the partial parametric approach, the receiver 16 is configured to "lump" the other signal and other-cell terms of the impairment correlation estimates together, as a basis for estimating that combined term as a unit. In other words, the receiver 16 is configured to estimate $$\tilde{R}_{os,oc}=\tilde{R}_{os}+\tilde{R}_{oc} \qquad \text{Eq. (27)}$$

This approach is called partial parametric because the receiver 16 forms $\tilde{R}_{ds}(n)$ parametrically, but derives $\tilde{R}_{os,oc}$ non-parametrically.

Of course, as detailed earlier herein, both the full and the partial parametric approaches use several estimation techniques. For example, this disclosure highlights three techniques to estimate the needed quantities, i.e., $\beta_{os/ps}$ and $N_o$ for the full parametric approach and $\tilde{R}_{os,oc}$ for the partial parametric approach. These estimation techniques include a least squares (LS) technique, a maximum-liklihood (ML) technique, and the minimum eigenvalue (MinEv) technique.

The least squares technique yields an estimate of the other-cell interference power $N_o$ and the so-called traffic-to-pilot ratios $\alpha_{T/P}(m)$ defined in relation to Eq. (11). Further, the ML processing yields an estimate of the other-to-pilot signal power ratio $\beta_{os/ps}$ and the current data signal transmit antenna power distribution vector $\bar{a}_{ds}$ defined earlier herein. Finally, the MinEV technique yields an estimate of the other-cell interference power $N_o$. As will be appreciated from the foregoing details, the full and partial parametric approaches use various combinations of these estimation techniques.

For example, the full parametric approach depends on the estimation of $\beta_{os/ps}$ and $N_o$. The receiver 16 uses either the LS or MinEv techniques to obtain a first estimate of $N_o$ and the ML technique is then used to obtain $\beta_{os/ps}$. The current antenna selection $\bar{a}_{ds}$ is obtained jointly in the ML estimation, and may or may not be used later, depending on whether a refined estimate of the other-cell interference power is desired. A refined estimate of the other-cell interference power $N_o$ can be obtained by using ML again, except this time treating $\beta_{os/ps}$ and $\bar{a}_{ds}$ as known values (using the just obtained estimates) and $N_o$ as unknown.

For the partial parametric approach, the receiver 16 estimates $\tilde{R}_{os,oc}$, which requires knowledge of the traffic-to-pilot ratios $\alpha_{T/P}(m)$ and the current antenna selection $\bar{a}_{ds}$. The traffic-to-pilot ratios $\alpha_{T/P}(m)$ are obtained through the LS technique. The other-cell interference power $N_o$ is also obtained as part of this processing but is not needed. The current antenna selection $\bar{a}_{ds}$ is obtained through the ML technique, which also yields the other-to-pilot signal power ratio $\beta_{os/ps}$, which is not needed in this approach.

Figure 9:
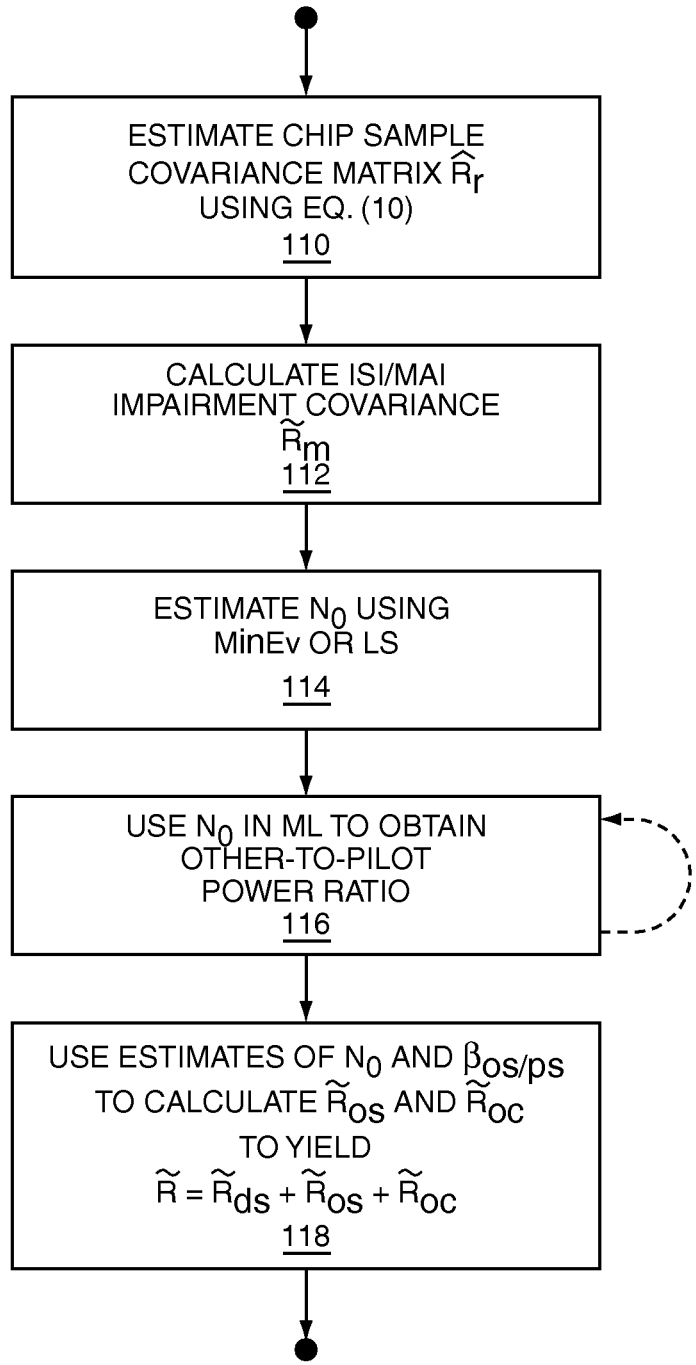
FIG. 9 is a logic flow diagram of one embodiment of processing logic for determining an overall or total impairment correlation estimate as a function of a data signal impairment correlation estimate, an other signal impairment correlation estimate, and an other-cell plus noise impairment correlation estimate, according to a full-parametric processing method.

FIG. 9 illustrates one embodiment of processing logic that may be implemented in the one or more processing circuits 20 of the receiver 16, for carrying out impairment correlation processing in a full parametric approach. Such processing may be performed within the receiver 16 by hardware, software, or any mix thereof, and such processing "begins" with forming an estimate of the chip-sample covariance matrix $\hat{R}_r$, in Eq. (10), also referred to as "data sample impairment correlations" (Step 110). Processing continues with the calculation of the ISI/MAI impairment correlations $\tilde{R}_m'$ according to Eq. (9), except omitting the "k=0" term (Step 112). Then, either the MinEv or the LS techniques described earlier herein are used to obtain a "rough" estimate of the other-cell interference power $N_o$ (Step 114). (The traffic-to-pilot ratios $\alpha_{T/P}(m)$ are a by-product of the LS technique, but these can be discarded or otherwise ignored.)

Processing continues by using the estimate of $N_o$ in ML processing to obtain an estimate of the other-to-pilot signal power ratio $\beta_{os/ps}$, i.e., the other-to-pilot transmit power ratio for the transmit antennas 14 (Step 116). As mentioned above, the current antenna selection $\bar{a}_{ds}$ is a by-product of this technique, but may be used depending on whether or not a refined estimate of the other-cell interference power is desired. Note that the processing of Step 116 may be iterated to obtain a refined estimate of other-cell interference power and possibly refined estimates of $\beta_{os/ps}$. Processing continues with using the final estimates of $\beta_{os/ps}$ and $N_o$, the parametric forms for the other signal component $R_{os}$ and the other-cell component $R_{oc}$, to calculate the impairment covariance matrix $\tilde{R}(n)$ (Step 118).

Figure 10:
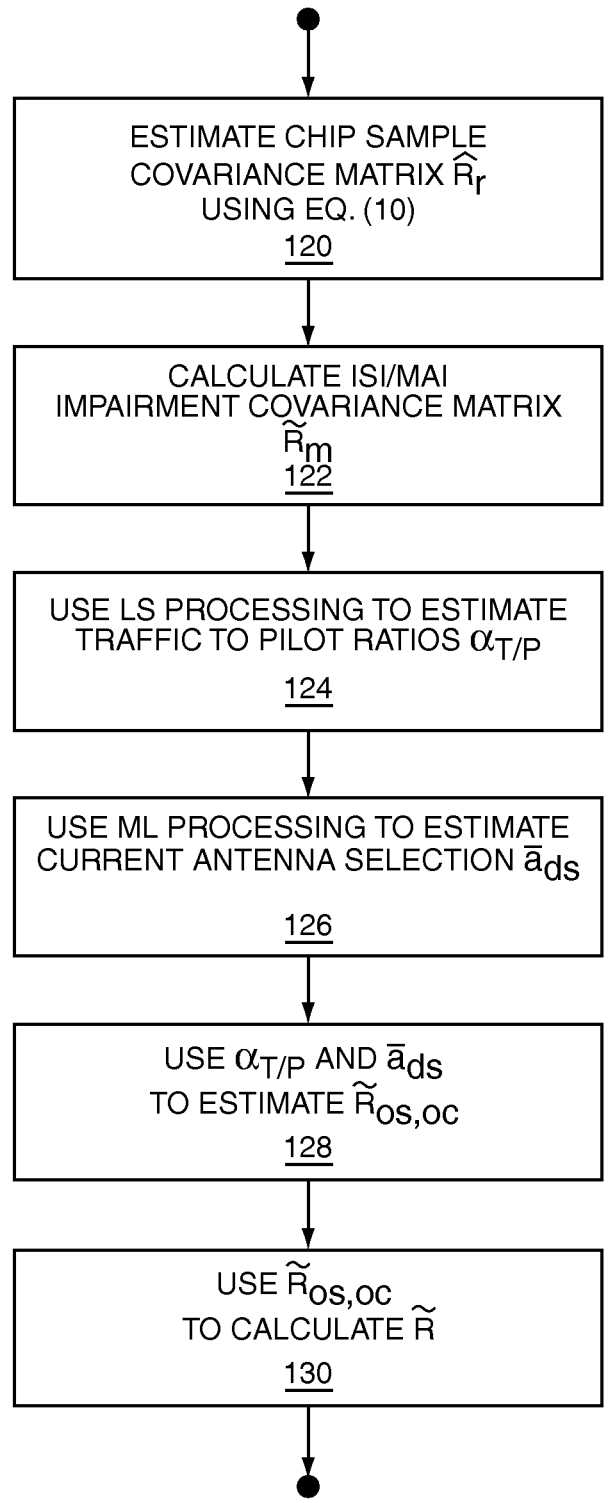
FIG. 10 is a logic flow diagram of one embodiment of processing logic for determining an overall or total impairment correlation estimate as a function of a data signal impairment correlation estimate, an other signal impairment correlation estimate, and an other-cell plus noise impairment correlation estimate, according to a partial-parametric processing method.

FIG. 10 illustrates a similar processing outline, but set in the context of partial parametric determination of the impairment correlations, $\tilde{R}$. Again, the one or more processing circuits 20 of the receiver 16 may comprise hardware, software, or any mix thereof to carry out the illustrated processing.

With this in mind, processing "begins" with forming an estimate of the chip-sample covariance matrix $\hat{R}_r$ as in Eq. (10) (Step 120). Processing continues with the calculation of the ISI/MAI impairment correlations $\tilde{R}_m'$ according to Eq. (9), except omitting the "k=0" term (Step 122). Then, the receiver 16 uses the previously described LS techniques to obtain estimates of the traffic-to-pilot ratios $\alpha_{T/P}(m)$ (Step 124). As mentioned above, the other-cell-interference power $N_o$ is a by-product of the LS technique, but it can be ignored with this approach. Processing continues with the receiver 16 using a ML formulation to obtain an estimate of the current antenna selection $\bar{a}_{ds}$ (Step 126). As mentioned above, the other-to-pilot signal power ratio $\beta_{os/ps}$ is a by-product of this technique, but it too can be ignored. Processing continues with the receiver 16 using the estimates of $\alpha_{T/P}(m)$ and $\bar{a}_{ds}$, estimate the combined other signal and other-cell portions of the impairment covariance matrix (Step 128), i.e., $\tilde{R}_{os,oc}$ (see equation Eq. (27) above) using Eq. (19). Now all terms of the impairment covariance matrix $\tilde{R}(n)$ in Eq. (24) are available for estimation of the overall impairment correlations (Step 130).

Thus, it should be understood that the receiver 16 is configured to determine impairment correlations in MIMO and other potentially complex reception environments, and that impairment correlation estimation as taught herein considers the effects of different types of signals being transmitted from different ones in a set of transmit antennas 14. With that point in mind, then, it should be understood that the present invention is not limited by the foregoing description, nor is it limited by the accompanying drawings. Instead, the present invention is limited only by the following claims, and their legal equivalents.

What is claimed is:

1. A method of supporting impairment correlation estimations by wireless communication receivers operating in a Multiple-Input-Multiple-Output (MIMO) or Multiple-Input-Single-Output (MISO) communication system that includes a transmitter having multiple transmit antennas and transmitting one or more data and pilot signals, the method comprising:

signaling at least one of a data-to-pilot signal transmit power ratio and transmit antenna power distributions for the data and pilot signals being transmitted by the wireless communication transmitter; and dynamically updating said signaling as a function of a current Multiple-Input-Multiple-Output (MIMO) mode.

* * * * *